US010667315B2

(12) United States Patent
Hassan et al.

(10) Patent No.: US 10,667,315 B2
(45) Date of Patent: May 26, 2020

(54) ROUTE AN EMERGENCY CALL OVER VOIP CLIENT TO CELLULAR DEVICE

(71) Applicant: Microsoft Technology Licensing, LLC, Redmond, WA (US)

(72) Inventors: Amer A. Hassan, Kirkland, WA (US); Mahendra D. Sekaran, Sammamish, WA (US); Michael J. Davis, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/019,320

(22) Filed: Jun. 26, 2018

(65) Prior Publication Data

US 2019/0394821 A1 Dec. 26, 2019

(51) Int. Cl.
*H04W 76/15* (2018.01)
*H04W 76/27* (2018.01)
(Continued)

(52) U.S. Cl.
CPC ......... *H04W 76/15* (2018.02); *H04L 65/1006* (2013.01); *H04W 4/90* (2018.02); *H04W 76/27* (2018.02); *H04W 4/80* (2018.02)

(58) Field of Classification Search
CPC ....... H04W 76/15; H04W 4/90; H04W 76/27; H04W 4/80; H04L 65/1006
See application file for complete search history.

(56) References Cited

U.S. PATENT DOCUMENTS

| 7,245,900 B1 | 7/2007 | Lamb et al. |
| 7,564,838 B2 | 7/2009 | McGary |

(Continued)

FOREIGN PATENT DOCUMENTS

| WO | 2007121331 A2 | 10/2007 |
| WO | 2017074814 A1 | 5/2017 |

OTHER PUBLICATIONS

"Non Final Office Action Issued in U.S. Appl. No. 16/019,164", dated Dec. 18, 2018, 11 Pages.
(Continued)

*Primary Examiner* — Duc C Ho
(74) *Attorney, Agent, or Firm* — Schwegman Lundberg & Woessner, P.A.

(57) ABSTRACT

Systems and methods for routing communications received via a PTSN are disclosed. A communication session server facilitates communication sessions between a first computing device, a second computing device and a public service accessible via a PSTN. The first computing device establishes a communication session with the communication session server using a first communication mode. The second computing device establishes a communication session with the public service using a second communication mode and a communication session with the communication session server using the first communication mode. Communications received by the second computing device from the public service via the second communication mode are routed to the communication session server via the first communication mode. The communication session server then sends the received communications to the first computing device using the first communication mode.

20 Claims, 10 Drawing Sheets

(51) Int. Cl.
*H04W 4/90* (2018.01)
*H04L 29/06* (2006.01)
*H04W 4/80* (2018.01)

(56) References Cited

U.S. PATENT DOCUMENTS

| | | | |
|---|---|---|---|
| 7,702,309 | B2 | 4/2010 | Faccin et al. |
| 8,718,596 | B1 | 5/2014 | Xue et al. |
| 8,743,782 | B1 | 6/2014 | Patel |
| 9,258,386 | B2 | 2/2016 | Croy |
| 9,369,575 | B2 | 6/2016 | Merino Gonzalez et al. |
| 9,374,696 | B2 | 6/2016 | Singer et al. |
| 9,479,897 | B2 | 10/2016 | Thompson et al. |
| 9,641,983 | B2 | 5/2017 | Venkatraman et al. |
| 9,775,093 | B2 | 9/2017 | Bonner et al. |
| 2005/0202830 | A1 | 9/2005 | Sudit |
| 2007/0049323 | A1 | 3/2007 | Wang et al. |
| 2007/0060097 | A1 | 3/2007 | Edge et al. |
| 2007/0153982 | A1 | 7/2007 | Bloebaum et al. |
| 2007/0242660 | A1 | 10/2007 | Xu |
| 2008/0182546 | A1 | 7/2008 | Wang et al. |
| 2008/0304487 | A1 | 12/2008 | Kotecha |
| 2009/0210536 | A1 | 8/2009 | Allen et al. |
| 2010/0279647 | A1* | 11/2010 | Jacobs ............... H04W 4/40 455/404.1 |
| 2011/0081911 | A1* | 4/2011 | Silver .................. H04L 12/66 455/445 |
| 2011/0116495 | A1 | 5/2011 | Purkayastha et al. |
| 2012/0157032 | A1* | 6/2012 | Goodman ............ H04W 76/50 455/404.1 |
| 2012/0284517 | A1 | 11/2012 | Lambert |
| 2013/0242775 | A1* | 9/2013 | Taylor ................ H04L 65/1006 370/252 |
| 2014/0036658 | A1 | 2/2014 | Bonner et al. |
| 2016/0142427 | A1* | 5/2016 | de los Reyes ......... H04L 63/20 726/23 |
| 2016/0277586 | A1 | 9/2016 | Mitchell |
| 2017/0325192 | A1 | 11/2017 | Annamalai et al. |
| 2017/0353892 | A1* | 12/2017 | Elia .................. H04W 4/90 |
| 2019/0037477 | A1 | 1/2019 | Isola |
| 2020/0037140 | A1 | 1/2020 | Hassan et al. |

OTHER PUBLICATIONS

"Caller Location in Support of Emergency Services", Retrieved From http://www.eena.org/uploads/gallery/files/pdf/2014_11_21_EENA_2_2_2_v2%200_FINAL.pdf, Nov. 21, 2014, 30 Pages.

Mazza, Massimo, "Lost Your Mobile Device? Here's How to Get It Back", Retrieved From https://www.krollontrack.co.uk/blog/making-data-simple/lost-mobile-device-heres-get-back/, Jul. 7, 2017, 3 Pages.

Rowe, et al., "Define the network elements used to determine location in Skype for Business Server 2015", Retrieved From https://docs.microsoft.com/en-us/skypeforbusiness/plan-your-deployment/enterprise-voice-solution/network-location, Aug. 17, 2015, 3 Pages.

Williams, et al., "Handset Derived Location for Emergency Calls", In EENA NG112 Technical Committee Document, Dec. 4, 2016, 13 Pages.

"Non Final Office Action Issued in U.S. Appl. No. 16/043,932", dated Jul. 26, 2019, 12 Pages.

"International Search Report and Written Opinion issued in PCT Application No. PCT/US19/037565", dated Sep. 6, 2019, 13 Pages.

"International Search Report and Written Opinion Issued in PCT Application No. PCT/US19/038086", dated Sep. 18, 2019, 11 Pages.

"Notice of Allowance Issued in U.S. Appl. No. 16/019,164", dated Sep. 18, 2019, 10 Pages.

"Final Office Action Issued in U.S. Appl. No. 16/043,932", dated Feb. 4, 2020, 12 Pages.

* cited by examiner

ROUTE AN EMERGENCY CALL OVER VOIP CLIENT TO CELLULAR DEVICE

TECHNICAL FIELD

The subject matter disclosed herein generally relates to Internet Protocol (IP) telephony and Voice-Over-IP (VoIP) and, in particular, to routing a communication session initiated by a first computing device using a communication protocol through a second computing device in communication with the first computing device, where audio and/or video received by the first computing device are communicated to an intended recipient via the second computing device and vice versa.

BACKGROUND

IP telephony and VoIP are technologies that generally encompass one or more techniques for conducting communication sessions over the Internet. In some instances, the communication sessions are between client applications being executed by computing devices, where the communication sessions include one or more audio and/or video streams. The communication sessions may be conducted using one or more communication protocols including, but not limited to, Transmission Control Protocol (TCP), Internet Protocol (IP), User Datagram Protocol (UDP), H.323, the Session Initiation Protocol (SIP), the Real-time Transport Protocol (RTP), the Skype Protocol, or combinations thereof (e.g., SIP over TCP).

Using a computing device and the client application, a user may establish a communication with another computing device executing the same, or similar client application. Further still, the user may establish a communication session with a device communicatively coupled to a different network than the computing device the user is using to conduct the communication session. For example, the computing device may be communicatively coupled to a packet-switched network, such as the Internet. Alternatively, an intended recipient (or second computing device) may be communicatively coupled to a circuit-switched network, such as the public switched telephone network (PSTN).

In some instances a user may desire to call a public service, such as an emergency service, using his or her computing device. Using the client application, the user may attempt to establish a communication session with the public service, where the public service is communicatively coupled to the PSTN. However, the user may be prohibited or prevented from establishing the communication session with the public service using the computing device.

BRIEF DESCRIPTION OF THE DRAWINGS

Some embodiments are illustrated by way of example and not limitation in the figures of the accompanying drawings.

DETAILED DESCRIPTION

Figure 1:
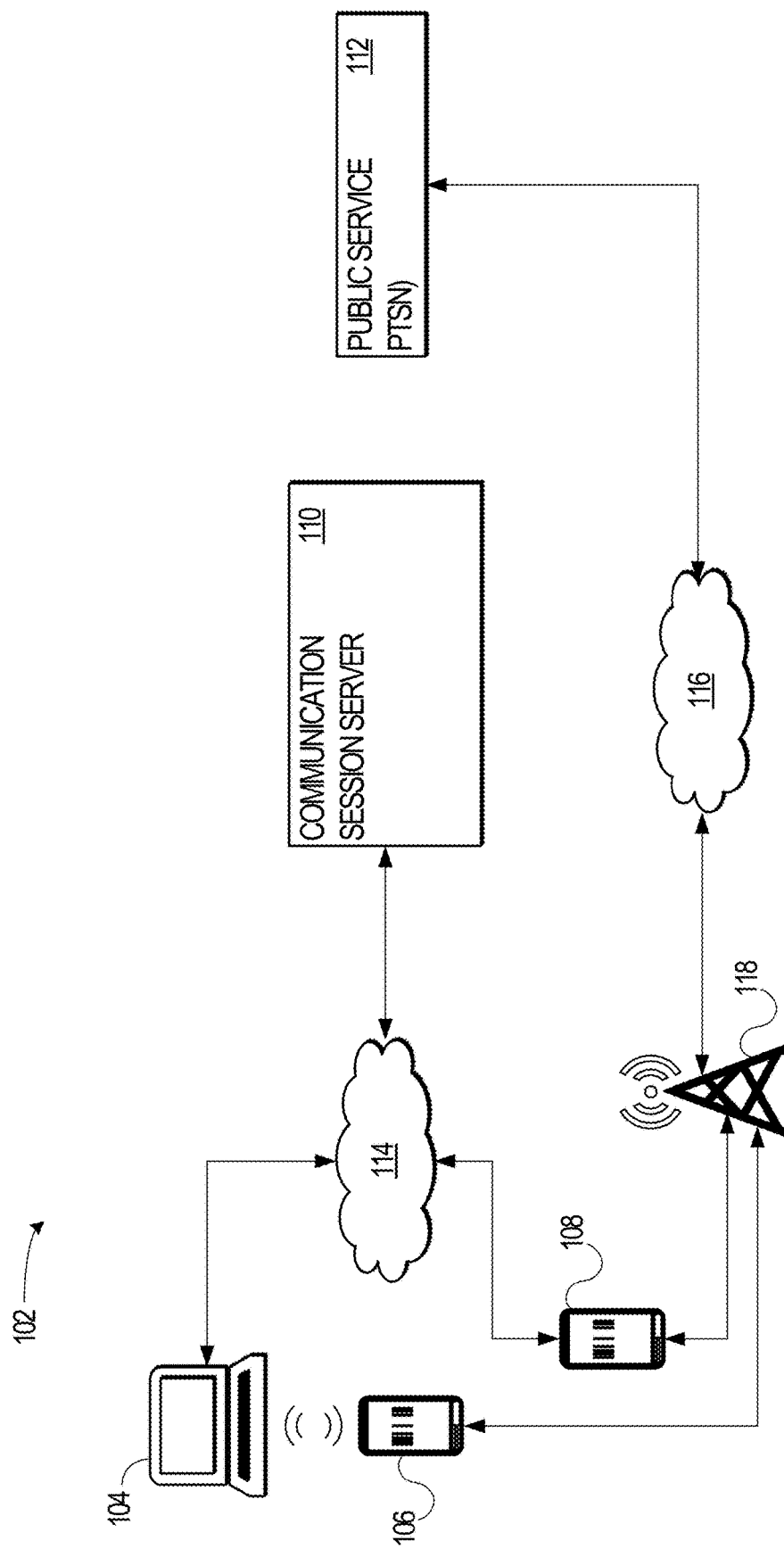
FIG. 1 is a block diagram illustrating a networked system, according to some example embodiments, including a communication session server communicatively coupled to one or more computing devices.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

This disclosure provides systems and methods for routing the audio and/or video of a communication session requested by a first computing device through a second computing device communicatively coupled to the first computing device. In one embodiment, the first computing device attempts to establish a communication service with an intended recipient, such as an emergency service or other public service, through a client application being executed by the first computing device. The client application may be in communication with a communication session server configured to facilitate and/or establish communication sessions among one or more of the client application being executed by other computing devices. In this manner, the communication session server may act as an intermediary to help client applications establish one or more communication sessions among each other. An example of a communication session server is a Skype for Business Server, which is available from the Microsoft Corporation, located in Redmond, Wash. An example of a client application configured to establish one or more communication sessions via the communication session server is the Skype for Business client application, which is available from the Microsoft Corporation. It will be understood by one of ordinary skill in the art that a Skype for Business Server and a Skype for Business client application are merely examples, and that other communication session servers and/or client applications may also be used.

In attempting to establish a communication session with the public service, the communication session server may determine that the first computing device is not authorized and/or permitted to establish the communication session. Accordingly, the communication session server may determine whether a second computing device in proximity to the first computing device is authorized and/or permitted to establish the communication session on behalf of the first computing device. Thus, the first computing device represents one of the endpoints in the communication session and the public service represents another endpoint.

In one embodiment, the second computing device is a mobile device, such as laptop, tablet, smartphone, or other such portable device, and the second computing device includes the client application configured to communicate with the communication session server. Further still, the second computing device may support multiple modes of communication via various frequencies and/or protocols. For example, the second computing device may be equipped with a wireless network transceiver and a cellular radio. In this example, the communication session server may instruct the second computing device, via the wireless network transceiver, to establish a communication session with the public service via the cellular radio. Further still, the communication session server may instruct the second computing device to transmit audio and/or video received from the public service to the first computing device and, similarly, may instruct the second computing device to transmit audio and/or video received from the first computing device to the public service. Accordingly, in this example, the communication session server and the second computing device are intermediaries in the communication session between the first computing device and the public service. In an alternative example, the second computing device and the first computing device may establish a direct communication channel, where audio and/or video intended for the public service is directly communicated to the second computing device and audio and/or video received from the public service is directly communicated to the first computing device. Examples of technologies that support the direct communication between devices include, but are not limited, Universal Serial Bus (USB), Wi-Fi Direct, Bluetooth®, and Near-Field Communications (NFC).

This disclosure describes several technical benefits to, and improvements within, the field of IP telephony and VoIP. One benefit is that a user of the first computing device can establish a communication session with an intended recipient even if the communication session server determines that the first computing device is not authorized or permitted to establish the requested communication session. For example, in some countries or regions, a computing device may not be authorized to use IP telephony or VoIP technologies to establish a communication session with an emergency server (e.g., 911 in the United States, 899 in the United Kingdom, 112 within the European Union, etc.) where the geographic location of the computing device cannot be, or is unable to be, determined.

However, the user may have a second computing device (e.g., a smartphone equipped with a Global Positioning System (GPS) transceiver) such that the location of the second computing device can be determined (e.g., within a few feet or inches of the actual location of the second computing device). Thus, configuring the second computing device to act as a relay or route for communications of the first computing device allows the user to use his or her first computing device to establish the communication session while the second computing device transmits and/or receives audio and/or video with the public service.

This configuration has particularly applicability where the user is currently using the first computing device, experiences an emergency, but is unable to interact with his or her second computing device even though the second computing device may be in close proximity to him or her. In this manner, the disclosed methodologies and/or components improve upon the field of IP telephony and/or VoIP because they effectively allow the first computing device to perform in a way that was not initially configured.

Another technical benefit disclosed herein is the functionality and implementation of the communication session server. In this regard, the disclosed embodiments extend the traditional role of a communication session server in acting as a gateway between one or more computing devices. More particularly, the disclosed embodiments provide for a communication session server that validates and/or determines whether a given computing device is authorized and/or permitted to establish a communication session with a particular party and/or entity (e.g., a public service). Where the computing device is not so authorized, the communication session server searches and identifies a compatible computing device that can complete the communication session or act as a relay for the communication session to occur. Thus, the disclosed embodiments of the described communication session extend the traditional functionalities that a conventional or typical communication session server may employ or perform.

This disclosure now turns to the various disclosed embodiments that implement the technical aspects described herein. FIG. 1 is a block diagram illustrating a networked system 102, according to some example embodiments, including a communication session server 110 communicatively coupled to one or more computing devices 104, 106, 108 (collectively 104-108). The communication session server 110 provides server-side functionality via a network 114 (e.g., the Internet or wide area network (WAN)) to one or more of the computing devices 104-108. The computing devices 104-108, such as the computing device 104, may include a client application and/or modules for interacting with the communication session server 110. Examples of application that may be instantiated by the computing device 104 include a web client, a single-purpose application (e.g., an "app"), a multi-purpose application (e.g., a programmatic client), or combinations thereof. The communication session server 110 is further communicatively coupled with other computing devices 106, 108, which may include similar applications and/or programs as the computing device 104.

The computing device 104 may comprise, but is not limited to, a mobile phone, desktop computer, laptop, portable digital assistant (PDA), smart phone, tablet, ultra book, netbook, laptop, multi-processor system, microprocessor-based or programmable consumer electronic, or any other communication device that a user may utilize to access the communication session server 110. In some embodiments, the computing device 104 may comprise a display module (not shown) to display information (e.g., in the form of user interfaces). In further embodiments, the computing device 104 may comprise one or more of touch screens, accelerometers, gyroscopes, cameras, microphones, global positioning system (GPS) devices, and so forth. The computing device 104 may be a device of a user that is used to perform various interactions with the communication session server 110, such as for requesting an insurance policy quote, updating payment information, reviewing insurance policy documents, and other such interactions.

In one embodiment, the communication session server 110 is a network-based appliance that facilitates bi-directional and/or unidirectional communications among one or more of the computing devices 104-108 and/or between one or more of the computing devices 104-108 and one or more entities, such as a public service 112. One or more users may interact with the computing devices 104-108 and, in some instances, the same user may interact with the computing device 104 and the computing devices 106, 108 (e.g., where the computing device 104 is a laptop computer and the computing device 106 is a smartphone). The one or more users may be a person, a machine, or other means of interacting with the computing device 104. In various embodiments, the user is not part of the networked system 102, but may interact with the networked system 102 via the computing device 104 or another means. For example, one or more portions of the networks 114, 116 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a Wi-Fi network, a WiMAX network, another type of network, or a combination of two or more such networks.

The computing device 104 may include one or more applications (also referred to as "apps") such as, but not limited to, a web browser, messaging application, electronic mail (email) application, a communication session application, and the like. In some embodiments, if the communication session application is stored on the computing device 104 as a native application, then this application is configured to locally provide the user interface and at least some of the functionalities used to communicate with the communication session server 110 (e.g., authenticate a user, establish a communication channel between one or more computing devices and/or services, display or output audio and/or video, capture audio and/or video using one or more input devices, etc.). Conversely if the communication session client is not stored on the computing device 104, the computing device 104 may use its web browser to access the services provided by the communication session server 110.

The user may interact with the networked system 102 via the computing device 104 or other means. For instance, the user provides input (e.g., touch screen input or alphanumeric input) to the computing device 104 and the input is communicated to the networked system 102 via the network 122. In this instance, the communication session server 110, in response to receiving the input from the user, communicates information to the computing device 104 via the network 122 to be presented to the user. In this way, the user can interact with the communication session server 110 using the computing device 104.

Further, while the networked system 102 shown in FIG. 1 employs a client-server architecture, the present subject matter is of course not limited to such an architecture, and could equally well find application in a distributed, or peer-to-peer, architecture system, for example.

In addition to the computing devices 104-108, the communication session server 110 communicates with different entities and/or services. Furthermore, one or more of the computing devices 104-108 may communicate with the communication session server 110 using a first set of communication protocols, and one or more of the computing devices 106-108 may be in communication with an entity and/or service (e.g., public service 112) using a second set of communication protocols or technologies. For example, the computing devices 106-108 may be configured to communicate with the communicate session server 110 using a wired communication interface, such as Ethernet, and/or a wireless communication interface, such as 802.11 b/g/n (e.g., Wi-Fi). Furthermore, the computing devices 104-108 may include a communication session application configured to communicate with the communication server 110 and establish one or more communication sessions using one or more communication protocols, such as TCP/IP, UDP, H.323, SIP, RTP, or combinations thereof (e.g., SIP over TCP, SIP over UDP, etc.).

Moreover, one or more of the computing devices 106-108 may include a transceiver configured to communicate with a cellular tower 118. For example, the computing devices 106-108 may be smartphones, and each smartphone may include a cellular radio configured to communicate using one or more mobile communications standards, such as Long-Term Evolution (LTE), Code Division Multiple Access (CDMA), and/or Global System for Mobiles (GSM). In this regard, the computing devices 106-108 may include a dialer application that operates as an interface between a user and the cellular radio such that the dialer application may be used to access the cellular tower 118 and communicate with one or more entities and/or services (e.g., the public service 112) via a PSTN.

As discussed below with reference to FIGS. 3-4, the dialer application and/or the operating system in which the dialer application executes may provide an application programming interface (API) that allows the communication session application to instruct the dialer application to execute one or more commands (e.g., dial a phone number associated with the public server 112). For example, the Android® operating system provides an API for accessing various dialing functions of a dialer application via the class CALL. As another example, the iOS® operating system provides access to one or more functionalities of a dialer application via the CallKit framework. Accordingly, where the computing devices 106-108 are configured to use the Android® operating system or the iOS® operating system, the communication session application may access and instruct the corresponding dialer application using the corresponding API. One of ordinary skill in the art will appreciate that the Android® operating system and the iOS® operating system are examples of operating systems that may be executed by a smartphone, and that the disclosed embodiments may be extended and applicable to other operating systems as well.

Further still, the communication session application may be configured to accept one or more commands from the communication session server 110 such that the communication session server 110 may instruct the communication session application being executed by the computing devices 106-108 to establish a communication session with the public service 112 via the dialer application. In this regard, the communication session server 110 may instruct the communication session application to instruct the dialer application to dial a given phone number, and to transmit audio and/or video received via the dialer application to the communication session server 110 via the communication session application.

In this manner, the communication session server 110 may facilitate communication sessions initiated by a first computing device (e.g., the computing device 104), and routed through a second computing device (e.g., the computing devices 106-108).

As an example, a communication session application being executed by the computing device 104 may attempt to establish a communication session with the public service 112 via the communication session server 110. In this example, the computing device 104 may attempt to establish the communication session using one or more communication protocols, such as H.323 or SIP, with the public service 112. The communication session server 110 may determine that the computing device 104 is not authorized or have permission to establish the communication with the public service 112 using the designated communication protocols. For example, the communication session server 110 may be unable to determine the location of the computing device 104 or the computing device 104 may be unable to provide its location, and having a location of the computing device 104 may be a prerequisite to the communication session server 110 establishing a communication session with the public service 112.

Accordingly, the communication session server 110 may then search and/or identify other computing devices (e.g., computing devices 106-108) through which the communication session may be establish. In one embodiment, the user of the computing device 104 is also a user of one of the identified computing devices (e.g., computing device 106). In addition, the communication session server 110 may maintain a record or log of the computing devices communicatively coupled to the communication session server 110 (e.g., "logged into") via a corresponding communication session application locally executable by the computing devices. The record or log may include information about connected computing devices including, but not limited to, the geographic location of the computing device, the type of computing device (e.g., smartphone, tablet, desktop computer, etc.), the operating system that the computing device is using to connect with the communication session server 110, a user identifier associated with the connected computing device and obtained via the communication session application, and other such information or combinations thereof. In this way, the communication session server 110 is configured to compare computing devices communicatively coupled with the communication session server 110 with computing devices associated with the user of the computing device 106.

Using a communication session application executable by the computing device 106, the communication session server 110 may request that the identified computing device 106 confirm its location (e.g., via a GPS transceiver housed within the computing device 106) or otherwise provide a relatively accurate identification of its location. In one embodiment, the communication session server 110 requests that the identified computing device 106 provide a geolocation location within a predetermined degree of tolerance (e.g., +/− one or more feet, to the nearest city, to the nearest township, etc.). In this context, a relatively accurate identification may The communication session server 110 may then instruct the communication session application executable by the identified computing device 106 to instruct a dialer application executable by the computing device 106 to establish the communication session with the public service 112 (e.g., via the cell tower 118).

In one embodiment, audio and/or video received by the dialer application is then provided as input to the communication session application of the computing device 106, which is then communicated to the communication session server 110. The communication session server 110 may then communicate the received audio and/or video the communication session application of the computing device 104, which may then be output by one or more output devices of the computing device 104 (e.g., by a display, one or more speakers, a headphone, etc.).

Similarly, audio and/or video input received by the computing device 104 may then be communicated to the communication session server 110, which then communicates the received audio and/or video to the communication session application of the computing device 106. In this way, the computing device 104 communicates with the public service 112 via the communication session server 110 and the computing device 106 (or the computing device 108), where the computing device 104 and the computing device 106 may use a first communication protocol (e.g., H.323 or SIP) to communicate with the communication session server 110, and where the computing device 106 uses a second communication protocol (e.g., LTE, CDMA, GSM, etc.) for communicating with the public service 112 via a cell tower 118.

Although the foregoing example describes the computing device 106 communicating with the computing device 104 via the communication session server 110, the computing device 106 may also communicate with the computing device 104 directly and relay audio and/or video received from the public service 112 to the computing device 104 without having to send the audio and/or video to the communication session server 110 to communicate it to the computing device 104. In one embodiment, the computing device 104 and the computing device 106 are communicatively coupled by one or more communication protocols, such as Bluetooth®, Wi-Fi Direct, and NFC, and the client applications of the computing devices 104-106 use a peer-to-peer communication protocol, such as the Skype Protocol, to send and/or receive audio and/or video. The instruction for the computing device 106 to directly communicate with the computing device 104 may originate from the communication session server 110 (e.g., where the communication channel between the communication session server 110 and the computing device 106 is of poor quality) and/or the instruction may originate from the computing device 104 after receiving a notification from the communication session server 110 that the communication session server 110 cannot permit and/or authorize the computing device 104 to establish a communication session with the public service 112.

In addition, the foregoing examples assume that the computing device 106 is owned and/or operated by the user of the computing device 104, and that the communication session server 110 is configured to determine and/or confirm the ownership (e.g., by referencing a database that associates the computing device 104 and the computing device 106 with the same user identifier). However, the foregoing examples may also be implemented where the second computing device is not owned and/or operated by the user of the first computing device. This embodiment may be implemented where the computing device 104 is attempting to establish a communication session with an emergency service, but is denied authorization and/or permission to do so by the communication session server 112. Accordingly, the computing device 104 may require access to another computing device to establish the communication session and route audio and/or video during the communication session.

In this regard, the communication session server 110 may communicate a broadcast message to computing devices in proximity to the computing device 104. In one embodiment, the communication session server 110 determines which computing devices are in proximity to the computing device 104 by comparing Internet Protocol (IP) addresses assigned to the computing devices. In another embodiment, the communication session application being executed by the computing device 104 may prompt the user for his or her approximate geographic location, and this information may be communicated to the communication session server 110 where it is logged for future reference. In this embodiment, the prompt for the geographic location may be displayed prior to the user attempting to establish a communication session with the public service 112 (e.g., when the computing device 104 first loads the communication session application).

Where the communication session server 110 identifies one or more computing devices in proximity to the computing device 104 and communicatively coupled to the communication session server 112 (e.g., computing device 108), the communication session server 112 may transmit a message to one or more of the identified computing devices requesting that the communication session server 112 be allowed to use the identified computing devices in establishing a communication session with the public server 112. In one embodiment, a computing device receiving the request (e.g., computing device 108) displays a prompt requesting the user of the computing device 108 to authorize the use by the communication session server 112. In another embodiment, the computing device 108 automatically accepts the request from the communication session server 112 (e.g., where the communication session server 112 determines that the entity on the other endpoint of the communication session is an emergency service). In this manner, should the computing device 104 be prevented from establishing a communication session with the public service 112 by the communication session server 110, the communication session server 110 can facilitate the routing of the communication session through an identified computing device (e.g., computing device 108), even if the identified computing device is not registered or owned by the user of the computing device 106.

In FIG. 1, the computing devices 106-108 are configured to communicate with the public server 112 via a cell tower 118 and a network 116. However, in some instances, the computing devices 106-108 may be unable to connect with the cell tower 118 (e.g., where the computing devices 106-108 do not have a sufficient cellular signal with the cell tower 118). Accordingly, in some instances, the computing devices 106-108 may establish a communication session with the public service 112 via the communication session application executable by the computing devices 106-108, and route audio and/or video received from the public service 112 to the computing device 104 via the communication session server 110.

Figure 2:
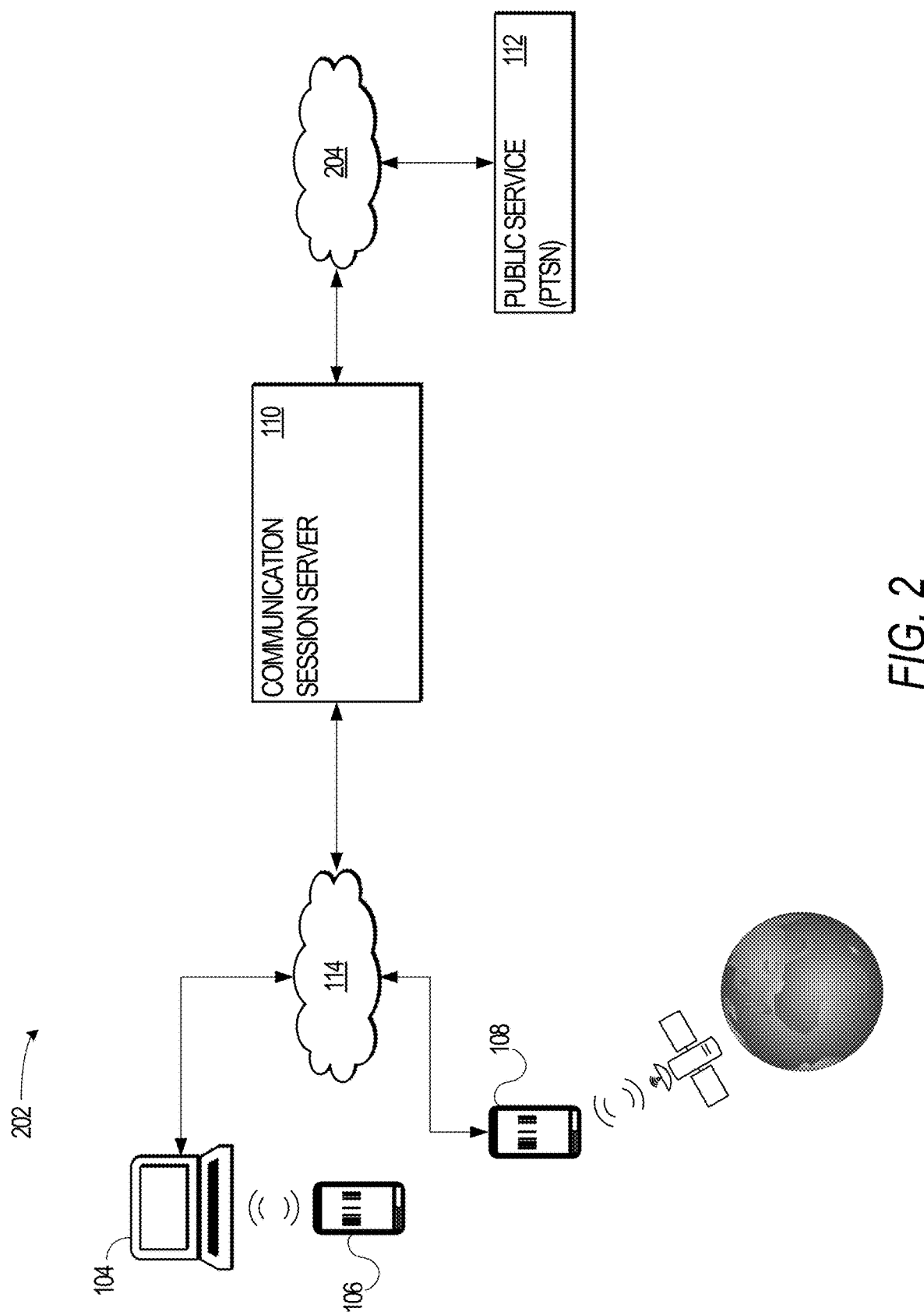
FIG. 2 illustrates an alternative implementation of the networked system shown in FIG. 1, where a communication session is conducted via the communication session server.

FIG. 2 illustrates an alternative implementation 202 of the networked system shown in FIG. 1, where a communication session is conducted via the communication session server 110. As with the implementation in FIG. 1, the communication session server 110 may initially deny, prevent, and/or prohibit the computing device 104 from establishing a communication session with the public service 112 (e.g., where the communication session server 110 is unable to verify and/or confirm the location of the computing device 104).

As in FIG. 1, the communication session server 110 may determine whether the user of the computing device 104 is also associated with any computing devices communicatively coupled with the computing device 104 (e.g., via NFC, via Bluetooth®, via Wi-Fi Direct, connected to a network using the same Service Set Identifier (SSID), etc.) and/or in proximity to the computing device 104. Additionally and/or alternatively, the communication session server 110 may also determine whether any computing devices are in proximity to the computing device 104 regardless of whether the user of the computing device 104 is associated with such devices. As explained with reference to FIG. 1, the communication session server 110 may also maintain a record or log of computing devices currently connected to the communication session server 110 (e.g., via corresponding communication session applications), and may use this record or log to identify those computing devices in proximity to the computing device 104.

Where a second computing device is identified (e.g., computing device 106 and/or computing device 108), the communication session server 110 may request that the identified computing device verify its location. Accordingly, in one embodiment, the identified computing device engages a GPS transceiver to determine its location, which is then communicated to the communication server 110. The communication session server 110 may then instruct or request a communication session application executable by the identified computing device to initiate a communication session with the public service 112 on behalf of the computing device 104. Accordingly, audio and/or video received by the computing device (e.g., computing device 106 and/or computing device 108), is then communicated to the communication session server 110 which, in turn, communicates the audio and/or video the computing device 104. In this way, the computing device 106 and/or the computing device 108 routes communications between the computing device 104, the communication session server 110, and the public service 112.

In one embodiment, the communication session server 110 transmits audio and/or video received from the public service 112 to the computing device 104 and/or to the computing device 106 and/or computing device 108. In this embodiment, the communication session server 110 receives the audio and/or video received from the public service 112 and communicates it to the computing device 104 instead of communicating the audio and/or video to the computing device 106 (or computing device 108), then receiving the same audio and/or video again from the computing device 106 (or computing device 108), and finally, communicating the audio and/or video to the computing device 106.

By having the computing device 106 and/or computing device 108 establish the communication session with the public service 112, the disclosed embodiments overcome the problem of the computing device 104 being unable to identify its geographic location. In addition, where the communication session uses the communication session server 110 to receive the audio and/or video from the public service 112, this implementation reduces network congestion because the communication session server 110 communicates the audio and/or video to the intended recipient (e.g., the computing device 104) rather than consuming network bandwidth by first communicating the audio and/or video to the computing device 106 and/or computing device 108, receiving that same audio and/or video from the computing device 106 and/or computing device 108, and then communicating that audio and/or video the computing device 104. Thus, the implementation 202 shown in FIG. 2, and its variations thereof, solve multiple technical and engineering problems that arise in distributing audio and/or video amongst multiple devices.

Figure 3:
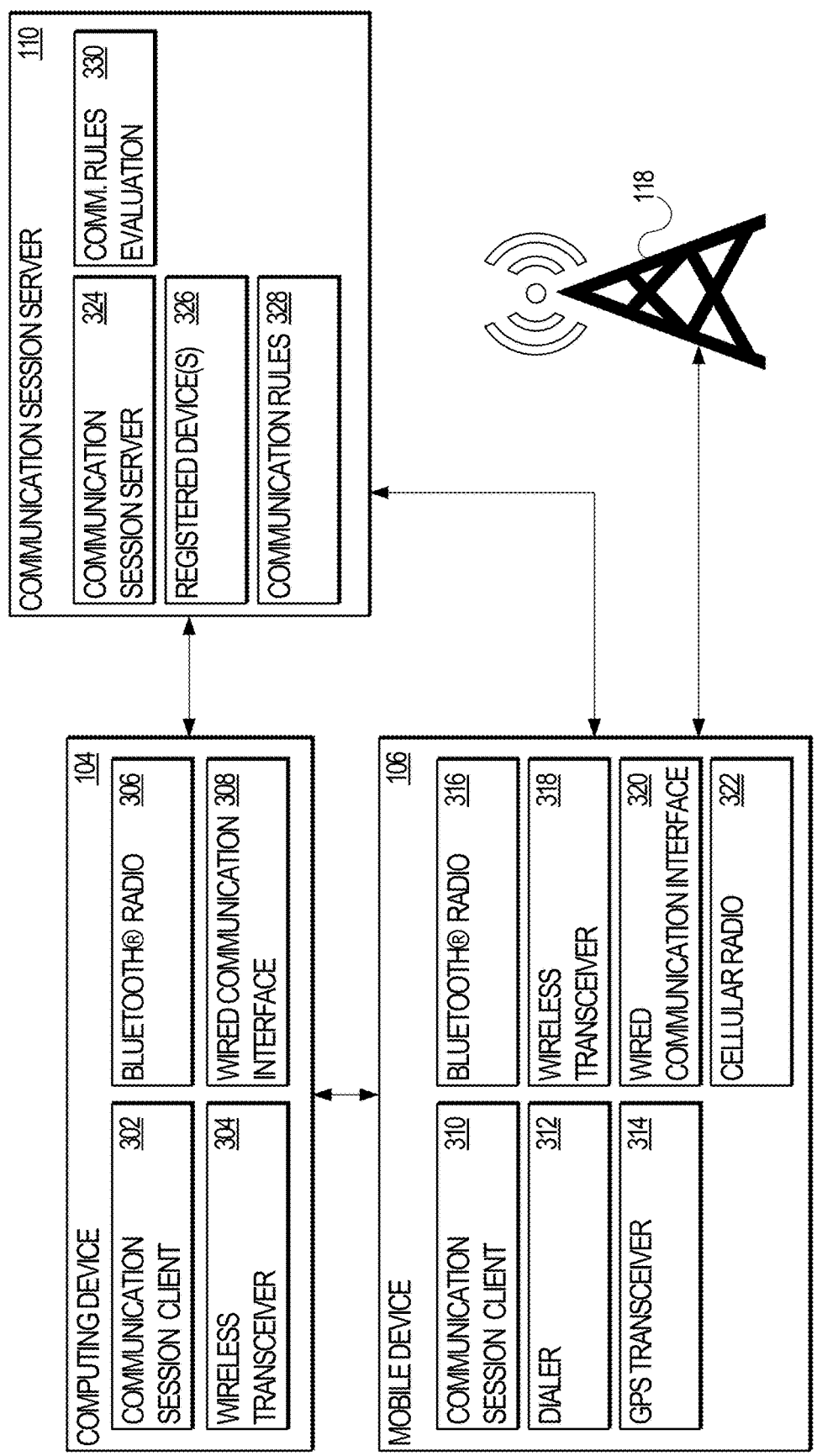
FIG. 3 illustrates applications and of the devices illustrated in FIG. 1, according to an example embodiment, where a mobile device uses the PSTN to conduct an established communication session.

FIG. 3 illustrates applications and data of the devices 104-106 illustrated in FIG. 1, according to an example embodiment, where a mobile device 106 uses the PSTN to conduct an established communication session. As shown in FIG. 3, and in one embodiment, the computing device 106 is a mobile device 106. The computing device 104, the mobile device 106, and the communication session server 110 may each include various application(s) and/or modules(s) to facilitate the communication session with a public service communicatively coupled to a PSTN and accessible by the computing device 104, the mobile device 106, and/or the communication session server 110.

The computing device 104, mobile device 106, and communication session server 110 also include various data and hardware to support one or more functionalities of the described application(s) and/or module(s). Although not shown in detail, the computing device 104, the mobile device 106, and/or the communication session server 110 may also include hardware and/or software components typically implemented in one or more computing devices, such as one or more hardware processors, one or more computer-readable media, one or more communication interfaces, one or more input and/or output devices, and other such components found in a computing device.

The various functional components of the computing device 104, the mobile device 106, and/or the communication session server 110 may reside on a single device or may be distributed across several computers in various arrangements. The various components of the computing device 104, the mobile device 106, and/or the communication session server 110 may access one or more databases (e.g., a registered device(s) database 326), and each of the various components of the computing device 104, the mobile device 106, and/or the communication session server 110 may be in communication with one another. Further, while the components of FIG. 3 are discussed in the singular sense, it will be appreciated that in other embodiments multiple instances of the components may be employed.

The computing device 104, the mobile device 106, and/or the communication session server 110 may include one or more processor(s) (not shown) configured to execute one or more computer-executable instructions for instantiating the various application(s)/module(s). The processor(s) of the computing device 104, the mobile device 106, and/or the communication session server 110 may be any type of commercially available processor, such as processors available from the Intel Corporation, Advanced Micro Devices, Texas Instruments, or other such processors. Further still, the one or more processors may include one or more special-purpose processors, such as a Field-Programmable Gate Array (FPGA) or an Application Specific Integrated Circuit (ASIC). The processor(s) may also include programmable logic or circuitry that is temporarily configured by software to perform certain operations. Thus, once configured by such software, the processor(s) become specific machines (or specific components of a machine) uniquely tailored to perform the configured functions and are no longer general-purpose processors.

The computing device 104, the mobile device 106, and/or the communication session server 110 also include one or more communication interface(s) for establishing one or more communication channels with various devices, servers, and equipment. In one embodiment, the computing device 104 includes a wireless transceiver 304, a Bluetooth® radio 306, and a wired network interface 308. The wireless transceiver 304 may be configured to establish a wireless communication channel with the communication session server 110 using one or more wireless communication protocols such as 802.11 b/g/n. Additionally and/or alternatively, the computing device 104 may establish a communication channel with the communication session server 110 via a wired communication interface 308 (e.g., an Ethernet interface).

In addition, the computing device 104 may use the wireless transceiver 304 to establish a wireless communication channel with a wireless local area network (LAN) and communicate with the mobile device 106 via the wireless transceiver 304 (e.g., where the computing device 104 and the mobile device 106 are communicatively coupled to the same SSID). Additionally and/or alternatively, the computing device 104 may communicate with the mobile device 106 via the Bluetooth® radio 306 using one or more Bluetooth® profiles. Furthermore, the computing device 104 may use a wired communication interface 308, such as USB, to communicate with the mobile device 106 using one or more communication protocols (e.g., the Skype Protocol, TCP/IP, the Android Debug Bridge (ADB) Protocol, etc.).

Like the computing device 104, the mobile device 106 may include one or more communication interfaces. In one embodiment, the mobile device 106 includes a Bluetooth® radio 316, a wireless transceiver 318, and a wired communication interface 320. As with the computing device 104, the mobile device 106 may use one or more of the components 316-320 to communicate with the computing device 104 and/or the communication session server 110. Further still, the mobile device 106 may also include a GPS transceiver 314 configured to communicate with a GPS satellite and a cellular radio 322 configured to communicate with a cellular tower 118 using one or more cellular communication technologies (e.g., LTE, CDMA, GSM, etc.). The mobile device 106 may use the GPS transceiver 314 to determine its geographic location and may provide the determined geographic location to the communication session server 110.

The communication session server 110 also includes various communication interfaces (not shown) for communicating with the computing device 104 and/or the mobile device 106. The communication interfaces may include one or more wireless interfaces (e.g., a wireless transceiver), one or more wired interfaces (e.g., a USB interface and/or an Ethernet interface), or combinations thereof.

Using various machine-readable media, the computing device 104, the mobile device 106 and/or the communication session server 110 implement one or more application(s) and/or module(s) and store various data relating thereto. The machine-readable media may include one or more devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable media" should be taken to include a single medium or multiple media (e.g., a centralized or distributed database, or associated caches and servers) able to store the application(s) and/or module(s) and data. The term "machine-readable media" may also include one or more machine-readable storage devices. Accordingly, the machine-readable medium may be implemented as a single storage apparatus or device, or, alternatively and/or additionally, as "cloud-based" storage systems or storage networks that include multiple storage apparatus or devices.

In one embodiment, the application(s) and/or module(s) of the computing device 104, the mobile device 106 and/or the communication session server 110 are written in a computer-programming and/or scripting language. Examples of such languages include, but are not limited to, C, C++, C#, Java, JavaScript, Perl, Python, or any other computer programming and/or scripting language now known or later developed. In this manner, each of the application(s) and/or module(s) may be implemented in one or more computer-programming and/or scripting language.

The computing device 104 and the mobile device 106 may each include a communication session client 302, 310 for communicating with the communication session server 110 and/or a public service. As discussed with reference to FIG. 1, the communication session clients 302, 310 may communicate using one or more of the components of the computing device 104 and mobile device 106, such as the wireless transceivers 304, 314, the Bluetooth® radios 306, 316, and/or the wired communication interface(s) 308, 320. In some instances the communication session client 310 of the mobile device 106 may also engage the GPS transceiver 314 (e.g., to provide a geographic location and/or approximate geographic location to the communication session server 110) and/or the cellular radio 322 (e.g., where a Wi-Fi signal is unavailable and/or where a wired communication channel is unavailable).

In addition, the communication session client 310 is configured to communicate with the dialer application 312 to establish a communication session to a public service via the cellular radio 322 and the cellular tower 118. As explained above with reference to FIG. 1, the communication session client 310 may call one or more of the functionalities of the dialer application 312 via an API that provides such functionalities. In one embodiment, the communication session server 110 provides an instruction to the communication session client 310 of the mobile device 106 to establish the communication session with the public service via the dialer application 312. In another embodiment, the communication session client 302 of the computing device 104 provides this instruction. In either instances, the communication session client 310 may route the audio and/or video received from the dialer application 312 to the communication session client 302 of the computing device 104. In one embodiment, routing of the audio and/or video may include communicating the audio and/or video the communication session server 110 (e.g., via a communication protocol such as SIP), which then relays the audio and/or video to the computing device 104. In another embodiment, the routing of the audio and/or video may include communicating the audio and/or video directly to the communication session client 302 of the computing device 104 using another communication protocol (e.g., the Skype Protocol).

In either embodiments, audio and/or video received from the dialer application 312 are communicated to the communication session client 302 of the computing device 104 (which is then output by corresponding output devices of the computing device 104), and audio and/or video received by the communication session client 302 of the computing device 104 are communicated to the dialer application 312 of the mobile device 106, which is then communicated to the public service. In this way, the communication session client 302 and the dialer application 312 are endpoints in a communication channel established between the computing device 104 and the public service, where the mobile device 106 acts as an intermediary between these two endpoints and where the communication session server 110 may also act as another intermediary.

The communication session server 110 includes various application(s) and/or data for establishing a communication session between the computing device 104 and a public service accessible via a PSTN. In one embodiment, the communication session server 110 includes a communication session server application 324, such as a Skype for Business Server. The communication session server 110 may also include one or more databases 326-328, such as a registered device(s) database 326 and a communication rules database 328. Finally, the communication session server 110 may include a communication rules evaluation application and/or module 330, which may be executable by the communication session server application 324, which evaluates one or more of the communication rules of the communication rules database 328.

In one embodiment, the communication session server 110 monitors connections between the communication session server application 324 and other communication session client applications (e.g., communication session application 302 or communication session application 310). To monitor these connections, the communication session server 110 may implement a database of registered device(s) (e.g., database 326). The registered device(s) database 326 includes a listing of devices that are associated with particular users, and whether those devices are connected to the communication session server 110. For example, each record in the registered device(s) database 326 may correspond to a device, where the record identifies the operating system of the device, the make and/or model of the device, the user associated with the device (e.g., via a user identifier), whether the device is connected with the communication session server 110 (e.g., via a communication session application), and the geographic location (or approximate geographic location) of the device. In one embodiment, the geographic location of a computing device is determined from a GPS transceiver housed within (or communicatively coupled with) the computing device. In another embodiment, the communication session server 110 and/or a communication session client determines an approximate geographic location using an IP address associated with the computing device (e.g., by using a geolocation service provider). In yet a further embodiment, the user of the computing device provides the geographic location and/or approximate geographic location of the computing device (e.g., via a prompt displayed by the communication session application).

The registered device(s) database 326 may be implemented as a relational database, a hierarchical database, an array, a linked list, a flat file, as a distributed database or a locally stored database, or combinations thereof. As one example, the registered device(s) database 326 may be implemented using Microsoft SQL Server and accessible via the communication session server application 324 using one or more Structured Query Language (SQL) statements.

In one embodiment, a user of a communication session client is informed of the information that the communication session server 110 monitors and is prompted to confirm that the user understands about the information monitoring. In some instances, the communication session server 110 may decline to connect a communication session application of a computing device where the user indicates that he or she does not agree to the information monitoring by the communication session server 110. When the user declines the information monitoring by the communication session server 110, the communication session server 110 does not allow the computing device to connect to the communication session server 110 and, thus, the communication session server 110 does not engage in information monitoring of the computing device.

By maintaining a registered device(s) database 326, the communication session server 110 is able to monitor and/or determine which computing devices are connected to the communication session server 110 (e.g., in communication with the communication session server application 324) and/or which computing devices are registered to particular users. In this manner, should the communication session server 110 deny the computing device 104 from establishing a communication session with a public service via the communication session server 110 and one or more IP telephony protocols, the communication session server application 324 can query the registered device(s) database 326 to determine whether any other computing devices of the user are communicatively coupled to the communication session server 110 (e.g., the record of the first computing device includes the same user identifier as the record of the second computing device). The communication session server application 324 may then send an instruction to the communication session application of the identified/determined computing devices (e.g., mobile device 106) to establish a communication session with the public service (e.g., via the dialer application 312), and route the transfer of audio and/or video between the computing device 104 and the public service.

Similarly, and as discussed with reference to FIG. 1, should the communication session server application 324 be unable to determine and/or identify any other computing devices of the user that are communicatively coupled to the communication session server 110, the communication session server application 324 may query the registered device(s) database 326 to identify any other computing devices that may be in proximity to the computing device 104, even if those computing devices are not associated with the user of the computing device 104 (e.g., a user identifier of a record associated with an identified computing device is not the same user identifier of the record associated with the computing device 104). In one embodiment, the communication session server application 324 references the geographic location attribute of one or more records of computing devices communicatively coupled to the communication session server 110 and selects those records that indicate a geographic location that is likely to be closest to the computing device 104.

In an alternative embodiment, the communication session server application 324 instructs the communication session application 302 of the computing device 104 to determine whether any other computing devices are in proximity to the computing device 104. In this embodiment, the communication session application 302 may send a network broadcast message requesting that other communication session applications respond to the broadcast message. Based on the responses (e.g., the responses indicate that a computing device is on the same subnet or using the same SSID as the computing device 104), the communication session application 302 informs the communication session server 110 of the nearby (or likely to be nearby) computing devices, and the communication session server 110 then communicates with those identified computing devices.

As explained previously, the communication session applications of the identified computing devices (e.g., computing devices that are not associated with the user of the computing device 104) may display a prompt or other message requesting permission for the identified computing device to be used to route audio and/or video between the computing device 104 and a public service (e.g., the identified computing device is to be used as an intermediary between the computing device 104 and the public service).

To determine whether the computing device 104 is authorized and/or permitted to communicate with a particular public service (or other entity) via the communication session server 110, the communication session server 110 includes a communication rules database 328 that specify under which condition(s) a computing device is authorized and/or permitted to communicate with a public service. The communication rules of the communication rules database 328 may be implemented using one or more grammar and/or syntax structures including, but not limited to, conditional statements (e.g., IF-THEN-ELSE statements), regular expressions, multiway branch statements (e.g., SWITCH statements), or combinations thereof. The communication session server 110 may further include a communication rules evaluation application 330 that evaluates one or more of the communication rules according to a provided input. The communication rules evaluation application 330 may also be a module or a component of the communication session server 324 and/or instantiated as process of the communication session server 110.

In one embodiment, a first communication rule specifies that a computing device is required to be registered with the communication session server 110 and to have a predetermined geographic location as a value for the corresponding record in the registered device(s) 326 database. In addition, a second communication rule may specify that computing devices of a particular type (e.g., a smartphone) or executing a particular operating system (e.g., the iOS® operating system and/or the Android® operating system) are required to provide a geographic location upon connecting with (e.g., logging into) the communication session server 110 via a corresponding communication session application. Furthermore, a third communication rule may specify multiple conditions for connecting with a public service, including the acceptable communication protocols (e.g., H.323 and/or SIP), the type of computing device authorized to establish such a communication session, and whether the computing device must have a determinable geographic location and/or a predetermined geographic location before establishing the communication session with the public service.

Accordingly, the communication rules evaluation application 330 may evaluate these rules for each of the computing devices (e.g., computing device 104 and mobile device 106) communicatively coupled to the communication session server 110. Additionally and/or alternatively, the communication rules evaluation application 330 may evaluate selected ones of the communication rules for connected computing devices (e.g., where a communication rule indicates it should be evaluated for a particular computing device type, operating system, communication protocol, or other such characteristic). When the communication rules evaluation application 330 is unable to satisfy one or more of the communication rules, the communication session server 110 may initially deny the communication session between the computing device 104 and the public service. When the communication rules evaluation application 330 is able to satisfy a predetermined one or set of communication rules, the communication rules evaluation application 330 may authorize the establishment of a requested communication session.

In the event that a denial has occurred, the communication session server application 324 may be configured to attempt the establishment of the communication session through the mobile device 106 (or other computing devices in proximity to the computing device 104). As disclosed herein, the communication session server 110 may attempt the establishment of a communication session via a mobile device 106 by communicating with the communication session application 310 executable (or being executed by) the mobile device 106. In this manner, the communication rules define the circumstances under which a communication session with a public service is permissible based on, but not limited to, the computing device type, the communication protocols being used, whether the computing device has a determinable or determined geographic location, and other such characteristics or combinations thereof.

Figure 4:
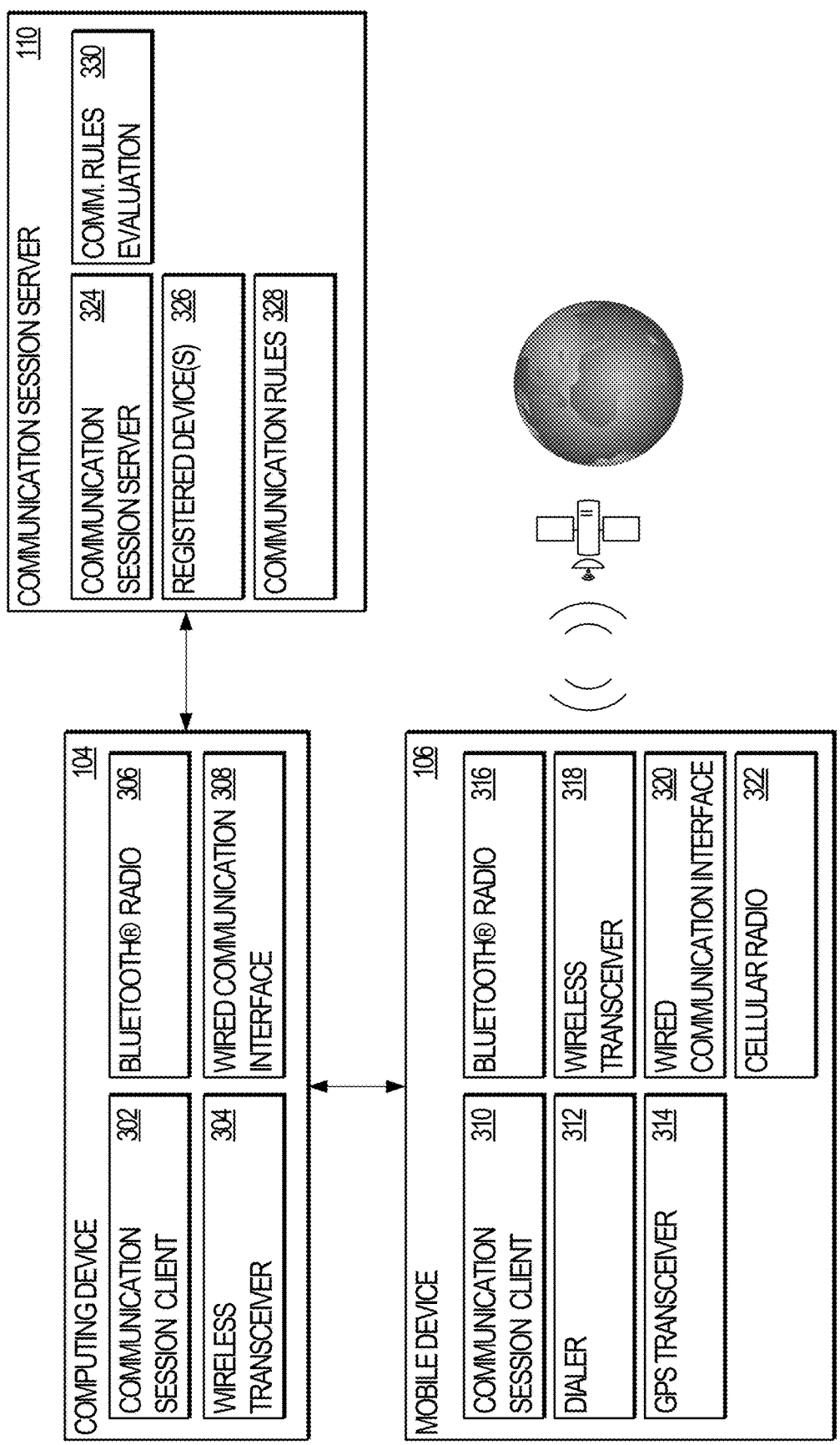
FIG. 4 illustrates another implementation of the application and data of the devices shown in FIG. 3, according to an example embodiment, where the mobile device uses the communication session server to conduct an established communication session.

FIG. 4 illustrates another implementation of the application and data of the devices shown in FIG. 3, according to an example embodiment, where the mobile device 106 uses the communication session server 110 to conduct an established communication session. As discussed above, the communication rules may specify that a computing device can establish a communication session using an IP telephony protocol or VoIP protocol (e.g., H.323, SIP, etc.) where a geographic location of the computing device is determinable or can be determined. In the implementation shown in FIG. 4, the computing device 104 may be unable to establish a communication session with a public service unassisted because the computing device 104 may not be able its geographic location and/or the user of the computing device 104 is unable to provide such location. Thus, initially, where the computing device 104 attempts to establish a communication session with a public service using an IP telephony or VoIP protocol, the communication session server 110 may initially deny the establishment of the communication session.

However, the mobile device 106 may be in proximity to the computing device 104. For example, the mobile device may be communicatively coupled to the computing device via the Bluetooth® radios 306, 316 or may be connected to the same wireless network as the computing device 104 (e.g., the computing device 104 and the mobile device 106 may have assigned IP addresses within the same subnet).

Furthermore, as the mobile device 106 is equipped with a GPS transceiver 314, the mobile device 106 is able to provide its geographic location to the communication session server 110. Thus, the mobile device 106 is configured to satisfy the one or more communication rules associated with establishing a communication session with a public service accessible via a PSTN. Accordingly, the communication session server application 324 may authorize the communication session between the computing device 104 and the public service using an IP telephony or VoIP protocol, where the mobile device 106 serves as an intermediary between the computing device 104 and the public service.

As explained previously, the mobile device 106 may communicate audio and/or video directly to the computing device 104 (e.g., via the Skype Protocol) or the mobile device 106 may communicate received audio and/or video to the communication session server 110, which then communicates the received audio and/or video the computing device 104 (e.g., via SIP over TCP). Additionally and/or alternatively, the communication session server 110 may communicate audio and/or video to the computing device 104 rather than increase network bandwidth load by communicating the received audio and/or video the mobile device 106, which would then communicate such audio and/or video the computing device 104—either directly or via the communication session server 110.

Figure 5:
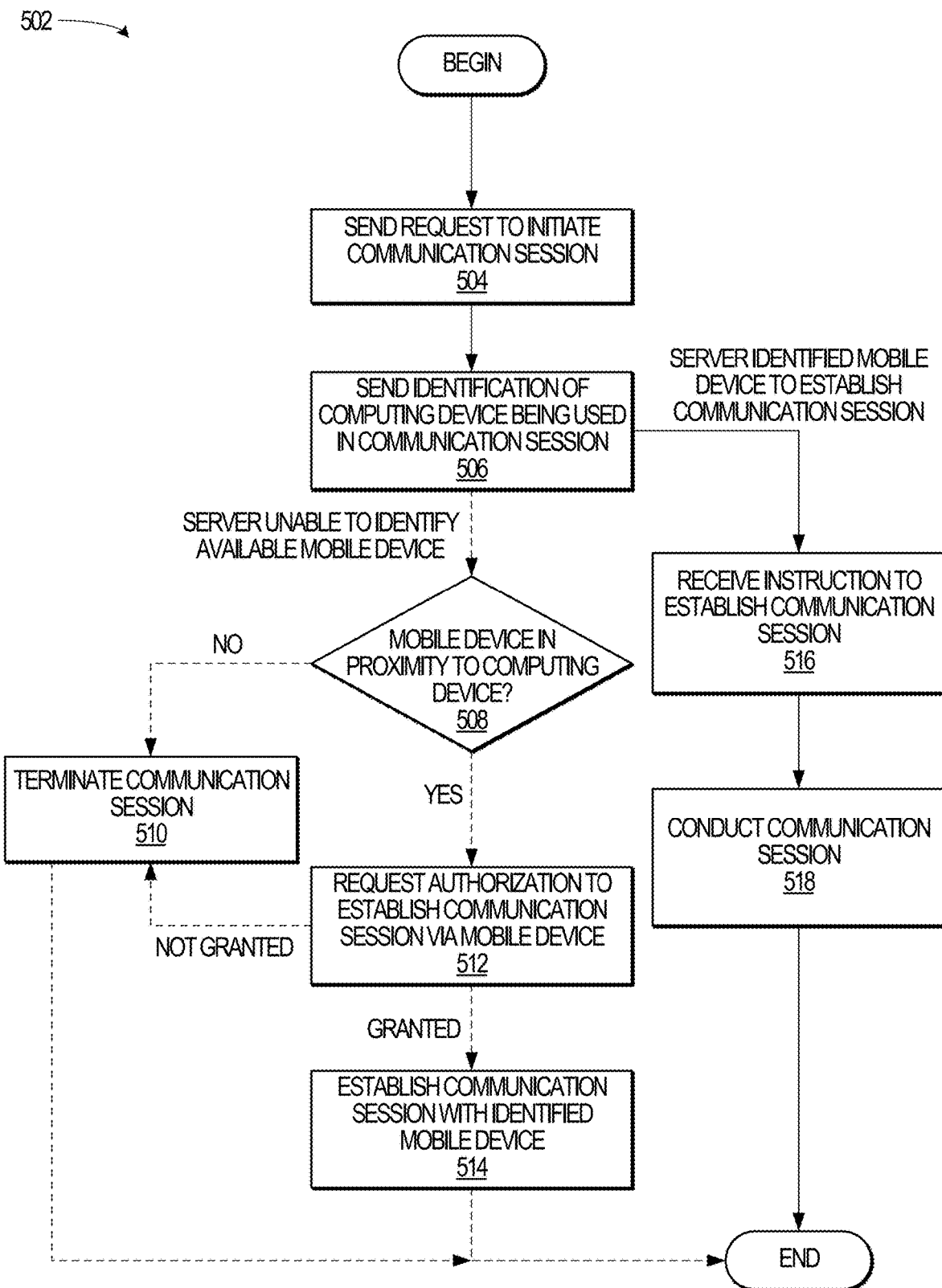
FIG. 5 illustrates a method, in accordance with an example embodiment, for establishing a communication session using a computing device shown in FIG. 1.

FIG. 5 illustrates a method 502, in accordance with an example embodiment, for establishing a communication session using a computing device shown in FIG. 1. The method 502 may be implemented by one or more of the devices and/or servers shown in FIGS. 1-2, along with one or more of the components illustrated in FIGS. 3-4, and is discussed by way of reference thereto.

With reference to FIG. 1, the method 502 illustrates a methodology of a first computing device, such as computing device 104, attempting to establish a communication session with a public service 112 using an IP telephony or VoIP protocol. Initially, the computing device 104 sends a request to the communication session server 110 to establish the communication session (Operation 504), where a first endpoint of the communication session comprises the computing device 104 and a second endpoint comprises the public service 112. In addition to the request, the computing device 104 may send identifying information about the computing device 104, such as the computing device type (e.g., laptop, smartphone, desktop computer, etc.), whether the computing device 104 can determine, or has attempted to determine, its geographic location, a user identifier associated with the computing device 104, and other such identifying information (Operation 506). In an alternative embodiment, the computing device 104 provides this information when the communication session application initially connects with the communication session server 110.

The communication session server 110 then determines whether it can establish the communication session between the computing device 104 and the public service 112. A more detailed explanation about this methodology is discussed with reference to FIGS. 6A-6B. With regard to FIG. 5, however, the computing device 104 receives one of several responses from the communication server 110: 1) a response indicating that the communication session is permissible, in which case, the computing device 104 proceeds to establish the communication session with the public service 112; 2) a response indicating that the communication session is not permissible and that no further attempts will be made to establish the communication session; or 3) a response indicating that the computing device 104 is to determine whether a second computing device is available to complete the communication session.

With regard to response (1) above, the computing device 104 may receive this first response whether the communication session is permissible with or without a second computing device. Where the communication session server 110 determines that a second computing device may be needed to complete the communication session on behalf the computing device 104, the computing device 104 still receives a message establishing the communication session (Operation 516). In one embodiment, the communication session server 110 acts as a moderator/intermediary between the computing device 104 and the identified second computing device; thus, from the perspective of the computing device 104, the computing device 104 is communicating with the public service 112 via the communication session server 110. The computing device 104 (or the user of the computing device 104) may be unaware that a second computing device is being used to establish the communication session (e.g., via a dialer application executable by the second computing device). In this manner, the second computing device is effectively transparent to the computing device 104 as it conducts the communication session with the public service 112 (Operation 518).

Additionally and/or alternatively, the computing device 104 may receive an instruction (e.g., response (3)) from the communication session server 110 to identify a second computing device to act as the intermediary for the communication session. Accordingly, in one embodiment, the computing device 104 may initially determine whether a second computing device, such as a mobile device, is in proximity to the computing device 104 (Operation 508). Where the computing device 104 determines that second computing device is not in proximity to the computing device 104 (e.g., the "NO" branch of Operation 508), the computing device 104 may end and/or terminate the communication session.

Alternatively, where the computing device 104 determines that a second computing device is in proximity to the computing device 104 (e.g., the "YES" branch of Operation 508), the computing device 104 may request authorization from the second computing device to establish the communication session (Operation 512). In one embodiment, the request for authorization may be communicated by the communication session application of the computing device 104 to the communication session application of the identified computing device. The request may be transparent to the user of the computing device 104, such as where the identified computing device is also associated with the user of the computing device 104. Additionally and/or alternatively, a prompt or other message may be displayed by the identified computing device requesting that the user of the identified computing device provide authorization to establish the communication session with the computing device 104.

Where the authorization is not granted (e.g., the "NOT GRANTED" branch of Operation 512), the computing device 104 may terminate the communication session. Alternatively, where the authorization is granted (e.g., the "GRANTED" branch of Operation 512), the computing device 104 establishes the communication session with the public service 112 via the identified computing device (Operation 514). The operations performed by the identified computing device that acts as the intermediary between the computing device 104 and the public service 112 is further discussed with reference to FIGS. 7A-7B.

Figure 6A:
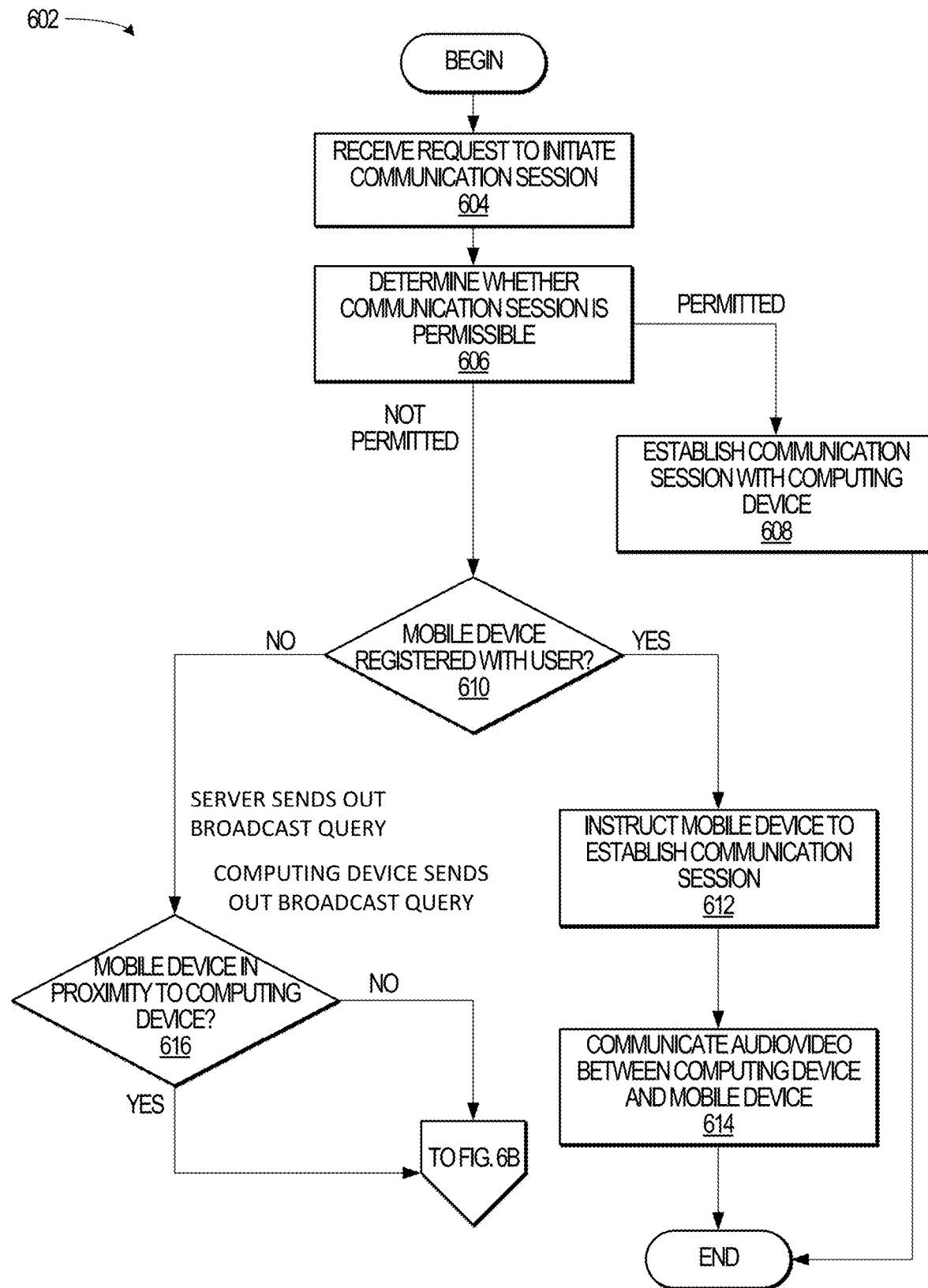
FIGS. 6A-6B illustrate a method, in accordance with an example embodiment, for routing a communication session through the mobile device shown in FIGS. 1-2.
Figure 6B:
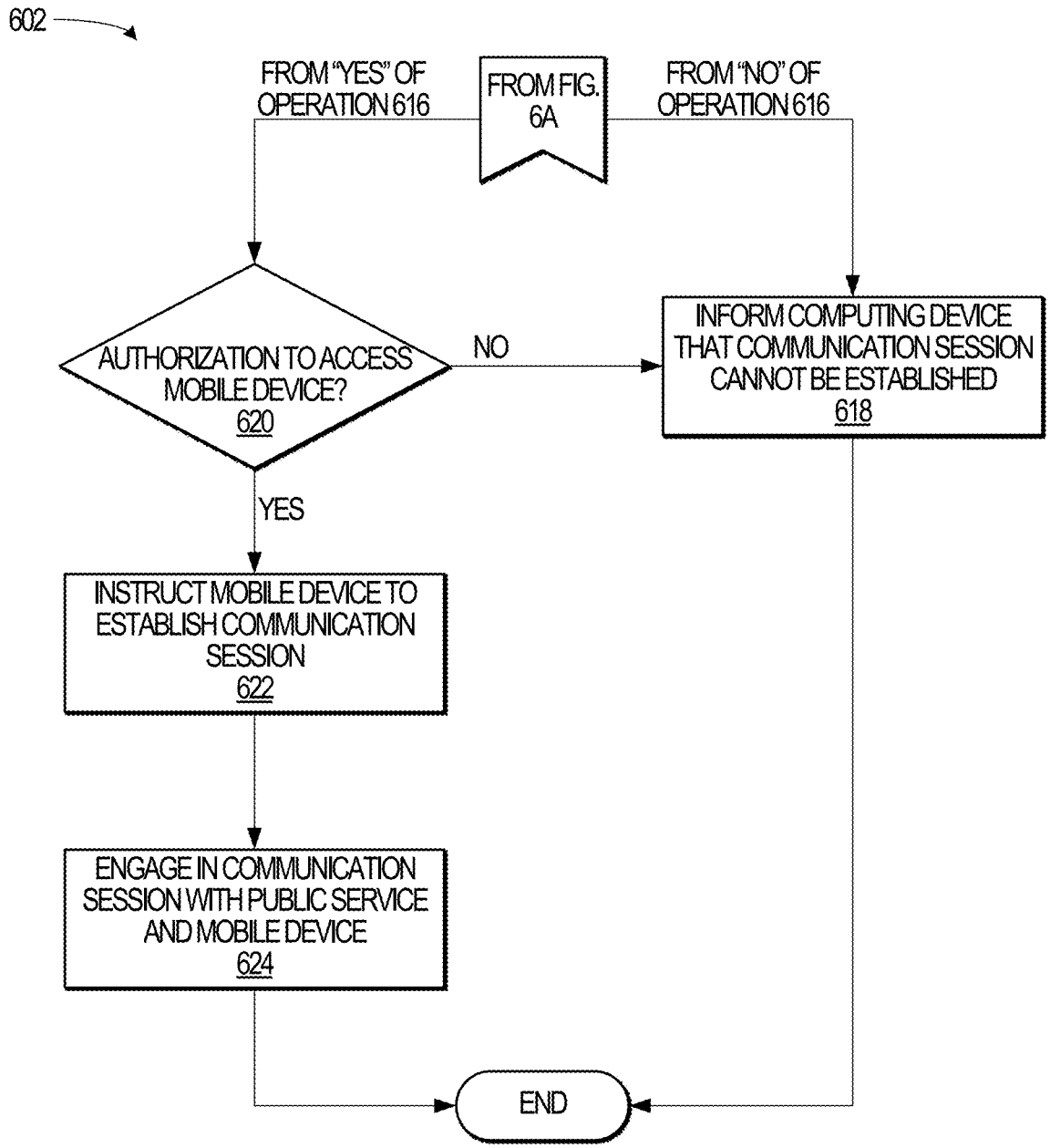

FIGS. 6A-6B illustrate a method 602, in accordance with an example embodiment, for routing a communication session through the mobile device shown in FIGS. 1-2. The method 602 may be implemented by one or more of the devices and/or servers shown in FIGS. 1-2, along with one or more of the components illustrated in FIGS. 3-4, and is discussed by way of reference thereto.

With reference to FIG. 1 and FIG. 6, the method 602 illustrates a methodology of the communication session server 110 attempting to establish a communication session with the public service 112 using a second computing device, such as a mobile device, as an intermediary between the communication session server 110 and the public service 112.

Turning to FIG. 6A, the communication session server 110 initially receives a request from a first computing device, such as computing device 104, to establish a communication session with a public service 112 accessible via a PSTN. In one embodiment (Operation 604). In one embodiment, the request is a message communicated in a transmission protocol, such as TCP or UDP. Additionally and/or alternatively, the request may be communicated using an IP telephony or VoIP protocol, such as H.323 or SIP.

The communication session server 110 then determines whether the communication session between the computing device 104 and the public service 112 is permissible (Operation 606). As discussed with reference to FIGS. 3-4, a communication session server application 324 may invoke and/or execute a communication rules evaluation application 330 to evaluate one or more communication rules stored in a communication rules database 328 in determining whether the communication session is permissible. In evaluating the one or more communication rules, the communication rules evaluation application 330 may reference one or more records stored in a registered device(s) database 326 and, in particular, one or more record attributes of a particular record.

In some instances, when evaluated, the communication rules may permit the communication session between the computing device 104 and the public service 112 (e.g., the "PERMITTED" branch of Operation 606). Accordingly, the communication session server 110 may then permit the communication session between the computing device 104 and the public service 112 (Operation 608).

Alternatively, when evaluated, the communication rules may not permit the communication session between the computing device 104 and the public service 112 (e.g., the "NOT PERMITTED" branch of Operation 606). However, the communication rules may permit or define an alternative course of action for establishing the communication session, such as by specifying that a second computing device may be used to establish the communication session where the geographic location of the second computing device is determinable and/or determined.

In this regard, the communication session server application 324 may first determine whether a second computing device (e.g., mobile device 106) is associated and/or registered with the user of the computing device 104 (Operation 610). In one embodiment, the communication session server application 324 performs this determination by comparing a user identifier attribute of the registered device record associated with the computing device 104 with the user identifier attribute of one or more registered device records for computing devices in communication with (e.g., logged into) the communication session server 110. In an alternative embodiment, the records correspond to users having a user account with the communication session server 110, and a user record identifiers those computing devices associated with a particular user.

Where the communication session server 110 determines that the mobile device 106 is associated with the user of the computing device 106 (e.g., the "YES" branch of Operation 610), the communication session server 110 communicates a message to a communication session application executable by the mobile device 106 to establish a communication session with the public service 112 initially requested by the computing device 104 (Operation 612). In one embodiment, the communication session server 110 then communicates audio and/or video received from the mobile device 106 to the computing device 104, and audio and/or video received from the computing device 104 to the mobile device 106 (Operation 614). In an alternative embodiment, the communication session server 110 instructs the computing device 104 and/or the mobile device 106 to establish a direct connection with the other computing device such that communications occur between the devices 104-106.

Referring back to Operation 610, the communication session server 110 may determine that there are no computing devices in communication with the communication session server 110 that are also registered to the user of the computing device 104 (e.g., the "NO" branch of Operation 610). In this regard, and in one embodiment, the communication session server 110 may then determine whether one or more computing devices are in proximity the computing device 104 (Operation 616). In one embodiment, the communication session server 110 performs this operation by referencing one or more records of the registered device(s) database 326 and, in particular, to a geographic location attribute of the records. The communication session server application 324 may then compare a geographic location attribute value of the retrieved records with a geographic attribute value of the record corresponding computing device 104 to determine which computing devices may be in proximity to the computing device 104 (e.g., within a predetermined and/or threshold distance). In another embodiment, the communication session server 110 references another attribute of the registered device record, such as an IP address attribute, and to locates potential computing devices that are within a predetermined distance and/or threshold of a geographic location of the computing device 104 through geolocation of the IP address value of the IP address attribute.

In yet a further embodiment, the communication session server 110 may communicate a message to the communication session application of the computing device 104 and instruct the computing device 104 to determine whether there are other computing devices within the proximity of the computing device 104 (Operation 616). In this embodiment, there is a presumption that the computing device 104 is in a better position to determine whether there are devices in proximity to it as the computing device 104 is able to leverage additional discovery methodologies (e.g., LAN discovery, Bluetooth® discovery, etc.) that are local to the location where the computing device 104 is located.

In addition to determining whether there are computing devices in proximity to the computing device 104, the communication session application of the computing device 104 may also broadcast message to the subnet of computing devices connected to the same SSID and/or LAN as the computing device 104. The communication session application may also transmit a broadcast message to computing devices that are visible through Bluetooth® discovery. The communication session application may transmit this message because, even though a computing device may be proximity to the computing device 104, the computing device 104 may not include a communication session application configured to communicate with the communication session application of the computing device 104. The broadcast message by the communication session application ensures that the computing device 104 is able to communicate with other computing devices that are proximate to the computing device 104.

Where a computing device proximate to the computing device 104 is unable to be determined, either by the communication session server 110 or the computing device 104, (e.g., the "NO" branch of Operation 616), the method 602 proceeds to Operation 618 on FIG. 6B. At Operation 618, the computing device 104 may display a message or prompt that the computing device 104 is unable to establish a communication session with an intended public service 112. In one embodiment, the communication session server 110 instructs the computing device 104 to display this message. In another embodiment, the communication session application of the computing device 104 determines that this message should be displayed. Additionally and/or alternatively, the computing device 104 may emit (or be instructed to emit) an alarm or other loud noise to alert others that may be nearby the user of the computing device 104 in the event that the user requires immediate assistance. The alarm and/or other loud noise may be configurable by the user as to when the computing device 104 should emit it, if at all.

Alternatively, where suitable computing devices are determined to be proximate to the computing device 104 via the communication session application of the computing device 104 and/or the communication session server 110 (e.g., the "YES" branch of Operation 616), the method 602 proceeds to Operation 620 on FIG. 6B. At Operation 620, the communication session server 110 determines whether it has authorization to access the identified computing device (e.g., the mobile device 106). In one embodiment, the communication session server 110 is granted immediate authorization to the identified computing device (e.g., where an emergency is involved) (e.g., the "YES" branch of Operation 620). In one embodiment, the communication session server 110 determines whether an emergency is involved by referencing one or more communication rules that specify those endpoints (e.g., phone numbers or other contacts) that are defined as an "emergency" (e.g., IF endpoint.contact=="911" THEN "emergency"), and use the endpoint contact initially attempted by the computing device 104 as the input to evaluate using one or more of those communication rules. In one embodiment, where none of the communication rules indicate that the endpoint contact is associated with an emergency, the communication session server 110 determines that an emergency is not involved.

In an alternative embodiment, the identified computing device is not associated with the user and an emergency is not involved; in this embodiment, a prompt or other message may be displayed on the identified computing device requesting whether authorization can be given to the communication session application of the computing device 104.

Where the communication session application is granted authorization, the method 602 proceeds to Operation 622. Where the communication session application is not granted authorization (e.g., the "NO" branch of Operation 620), the method 602 proceeds back to Operation 618.

At Operation 622, the communication session server 110 instructs the identified computing device (e.g., the mobile device 106) to establish a communication session with the public service that the computing device 104 initially intended to contact. As discussed with reference to FIGS. 2-3, the identified computing device may include a dialer application 312, and a communication session application 310 of the identified computing device may be configured to access one or more of the functionalities of the dialer application 312 through a disclosed API. In one embodiment, the identified computing device contacts the requested public service 112 via the dialer application 312, which communicates received audio and/or video from the public service 112 to the communication session server 110 via the communication session application (Operation 624). In an alternative embodiment, the communication session server 110 instructs the computing device 104 and/or the mobile device 106 to establish a direct connection with the other computing device such that communications occur between the computing devices 104-106 (Operation 624).

Having thus described the manner in which the computing device 104 and the communication session server 110 cooperate to establish a communication session with the public service 112, this disclosure turns to the operations of the second computing device (e.g., the mobile device 106) that the communication session server 110 uses to route audio and/or video to and from the public service 112.

Figure 7A:
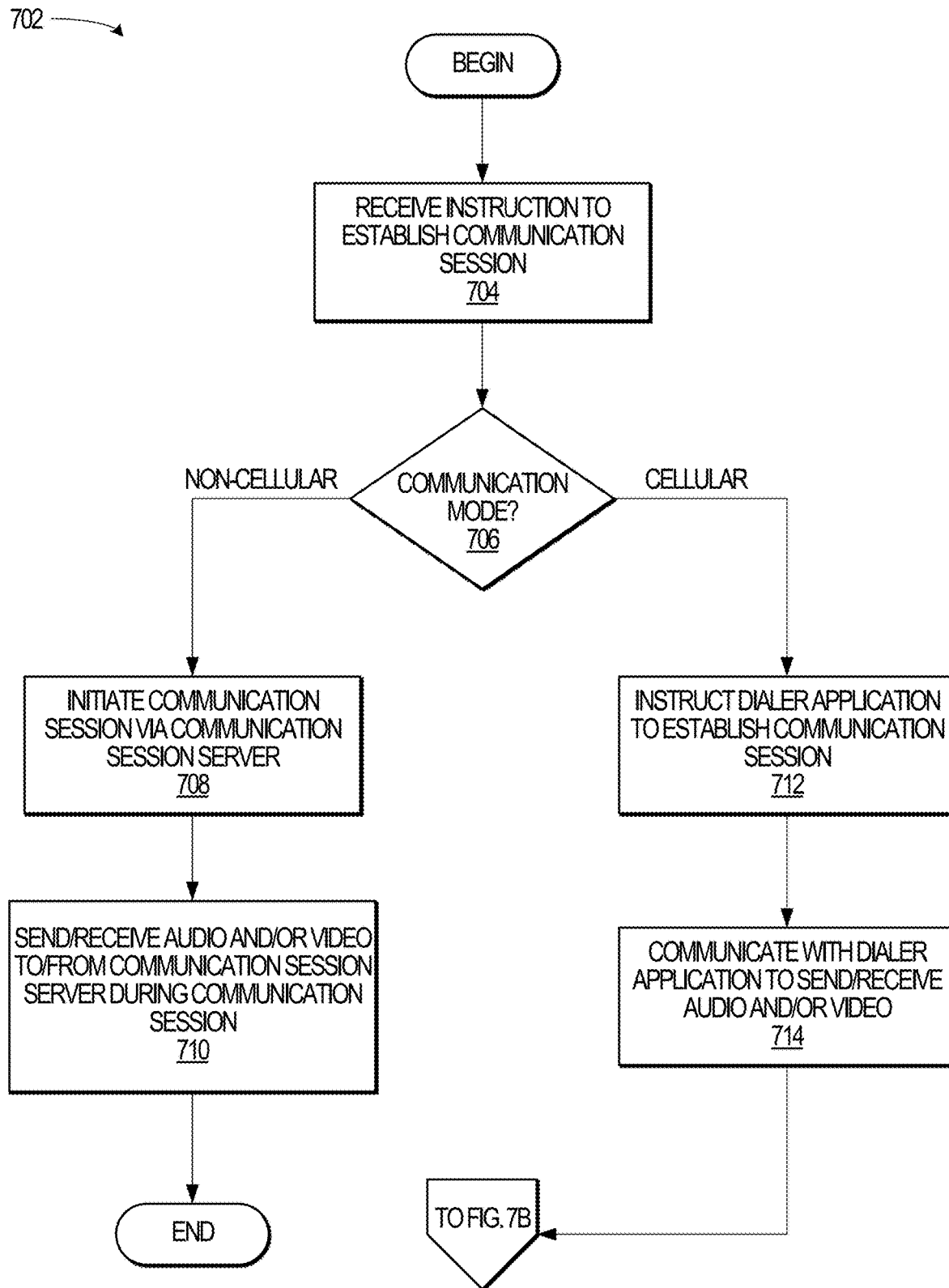
FIGS. 7A-7B illustrate a method, in accordance with an example embodiment, of the mobile device of FIGS. 1-2 being used to route a communication session initiated by the computing device of FIG. 1.
Figure 7B:
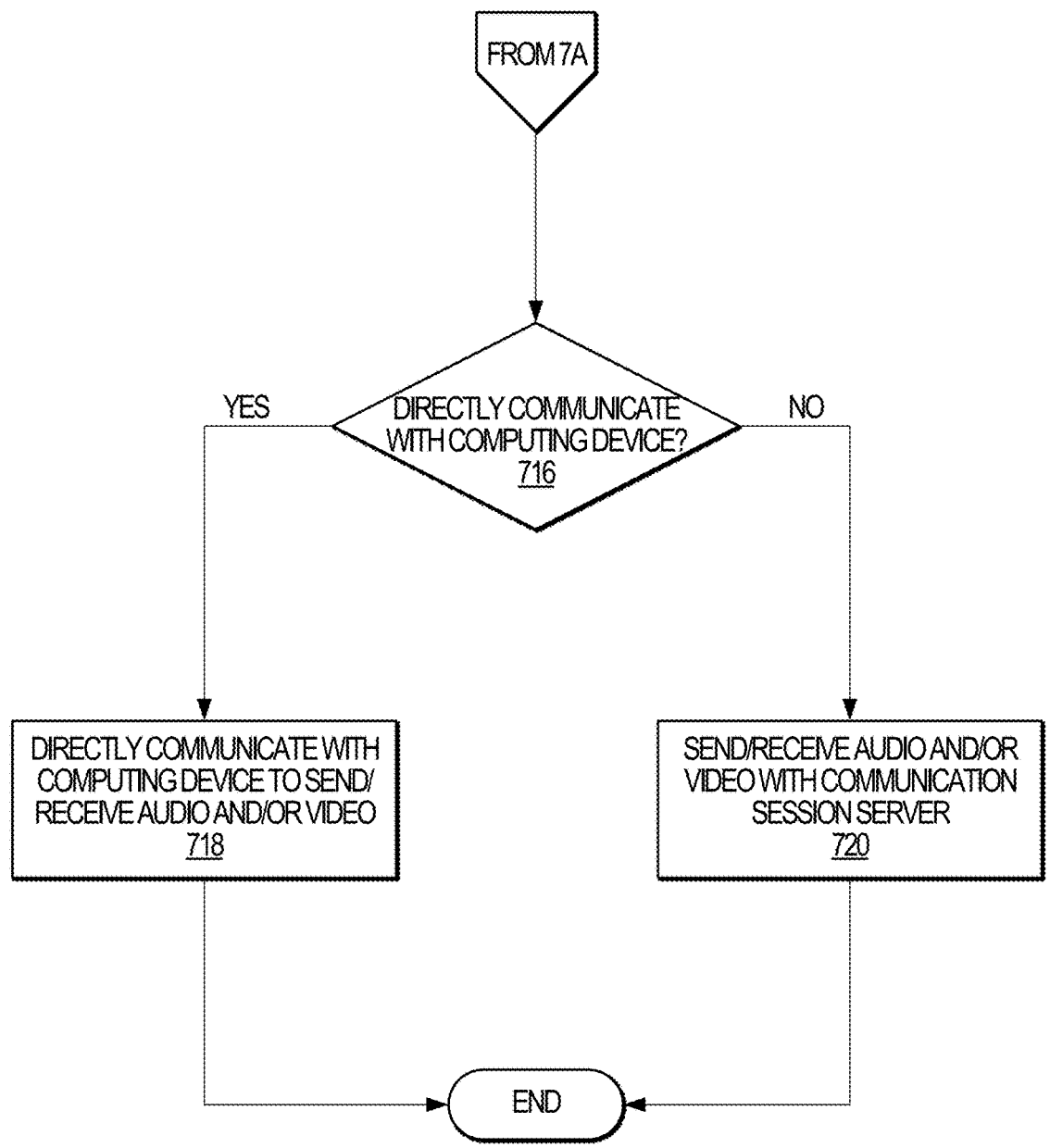

FIGS. 7A-7B illustrate a method 702, in accordance with an example embodiment, of the mobile device 106 of FIGS. 3-4 being used to route a communication session initiated by the computing device 104 of FIG. 1. The method 702 may be implemented by one or more of the devices and/or servers shown in FIGS. 1-2, along with one or more of the components illustrated in FIGS. 3-4, and is discussed by way of reference thereto.

With reference to FIG. 1 and FIG. 7, the method 702 illustrates a methodology of using the mobile device 106 to establish a communication session with the public service 112 in response to a determination that the computing device 104 is prevented and/or prohibited from establishing the communication session. In the context of FIG. 7, it is presumed that the communication session server 110 has identified the mobile device 106 as a suitable device for establishing the communication session, and that the mobile device 106 (or the user of the mobile device 106) has granted authorization to the communication session server 110 to use the mobile device 106.

Initially, and with reference to FIG. 7A, the mobile device 106 receives an instruction to establish a communication session with a public service 112 (Operation 704). In one embodiment, the instruction may be received from the communication session server 110. In another embodiment, the instruction may be received from the computing device 104.

The mobile device 106 then determines the communication mode for the communication session with the public service 112 (Operation 706). In one embodiment, the instruction from the communication session server 110 and/or the computing device 104 instructs the mobile device 106 as to the communication mode of the communication session with the public service 112. In another embodiment, the mobile device 106 determines the strength and/or quality of a first communication mode (e.g., 802.11 b/g/n), determines the strength and/or quality of a second communication mode (e.g., LTE, CDMA, GSM, etc.), and selects the communication mode with the better strength and/or quality. In yet another alternative embodiment, the mobile device 106 initially selects a first communication mode (e.g., cellular) and, if unable to establish a connection via the first communication mode, then selects a secondary communication mode (e.g., 802.11 b/g/n).

Where the mobile device 106 determines that a non-cellular communication mode is more suitable for the communication session (e.g., the "NON-CELLULAR" branch of Operation 706), the mobile device 106 initiates a communication session with the communication session server 110, and informs the communication session server 110 that the public service 112 is an endpoint of the communication session (Operation 708). Thereafter, the mobile device 106 engages in the communication session with the public service 112 using the non-cellular communication mode as discussed previously, where the mobile device 106 uses a predetermined communication protocol for communicating with the public service 112 (e.g., SIP over TCP) (Operation 710).

Alternatively, where the mobile device 106 determines (or selects) a cellular communication mode (e.g., the "CELLULAR" branch of Operation 706), the communication session application 310 instructs a dialer application 312 to contact the public service 112 initially designated by the computing device 104 as the endpoint of the communication session (Operation 712). As explained previously, the operating system of the mobile device 106 may allow access to one or more functionalities of the dialer application 312 through a publicly disclosed API. The communication session application 310 then operates in conjunction with the dialer application 312 to provide audio and/or video from the public service 312 to the computing device 104 (Operation 714).

Referring next to FIG. 7B, the mobile device 106 then determines whether the communication with the computing device 104 is direct or through an intermediary (e.g., the communication session server 110) (Operation 716). In one embodiment, this determination is performed initially when the mobile device 106 receives the instruction to establish a communication session with the public service 112; in this regard, the instruction may also include an indication of whether the mobile device 106 is to communicate with the computing device 104 (e.g., via a direct communication protocol) or with the communication session server 110 (e.g., via an IP telephony or VoIP protocol).

Where the mobile device 106 determines that the communication with the computing device 104 is direct communication (e.g., the "YES" branch of Operation 716), the mobile device 106 communicate audio and/or video received from the public service 112 directly to the computing device 104 (e.g., without the communication session server 110 acting as an intermediary) and vice versa (Operation 718). Alternatively, where the mobile device 106 determines that the communication with the computing device 104 is not direct communication (e.g., the "NO" branch of Operation 716), the mobile device 106 communicates received audio and/or video from the public service 112 to the communication session server 110, which then communicates the received audio and/or video to the computing device 104 (Operation 720).

In this manner, the disclosed communication session server 110 and/or mobile device 106 extend the functionalities of the computing device 104 where the computing device 104 may be prohibited and/or prevented from communicating with a public service via one or more communication protocols or using one or more communication modes. Furthermore, the disclosed embodiments improve upon existing communication technologies because the secondary computing device (e.g., mobile device 106) can be used as a platform to route audio and/or video from a public service 112 using a particular communication mode where the computing device 104 may be prohibited or prevented from communicating with the public service 112 using another type of communication mode. Accordingly, the disclosed embodiments provide numerous technical benefits and advantages that were not previously realized with traditional communication arrangements and methodologies.

Modules, Components, and Logic

Certain embodiments are described herein as including logic or a number of components, modules, or mechanisms. Modules may constitute either software modules (e.g., code embodied on a machine-readable medium or machine-readable storage device) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a FPGA or an ASIC. A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-7B are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Example Machine Architecture and Machine-Readable Medium

Figure 8:
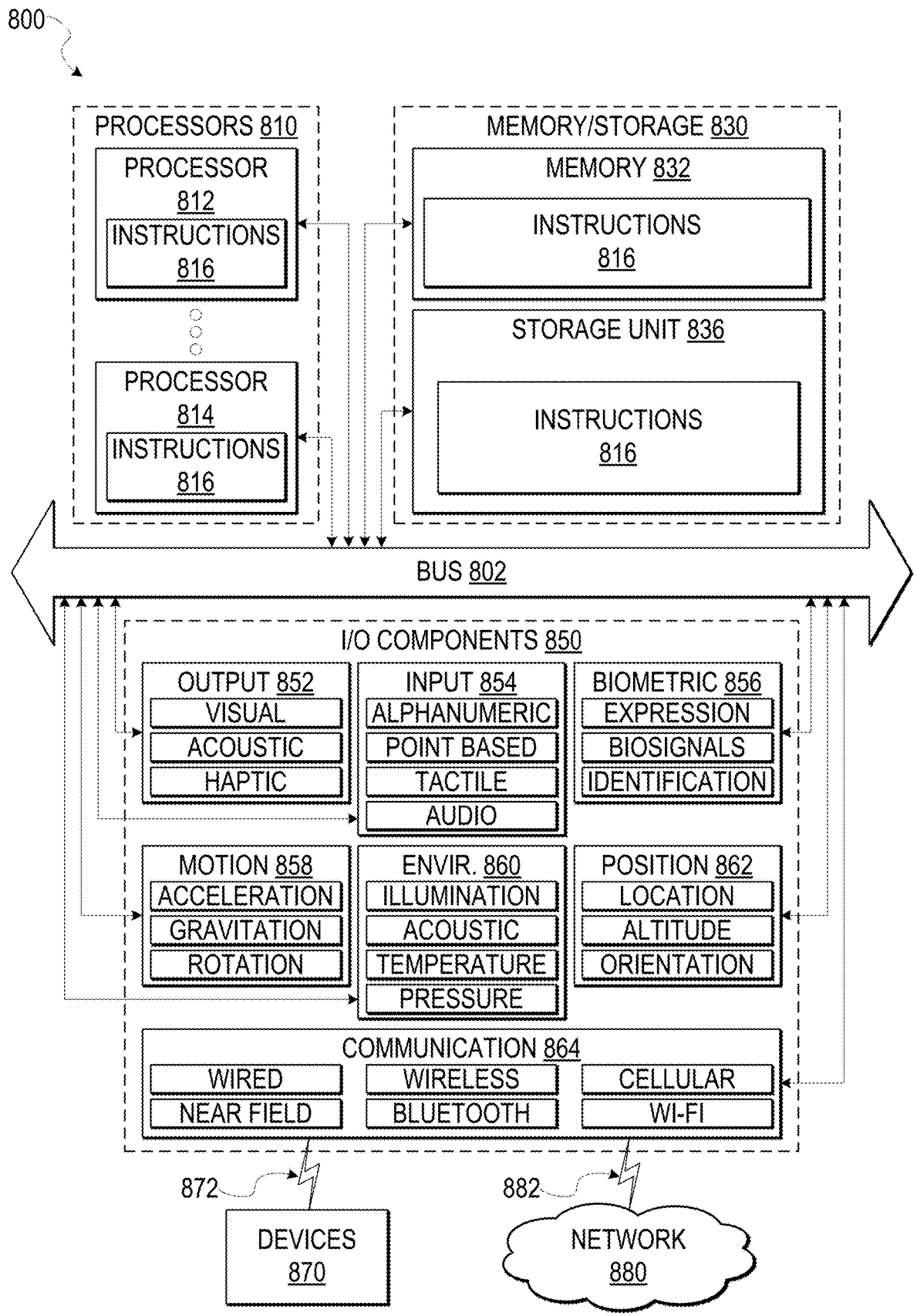
FIG. 8 is a block diagram illustrating components of a machine, according to some example embodiments, able to read instructions from a machine-readable medium (e.g., a machine-readable storage medium or machine-readable storage device) and perform any one or more of the methodologies discussed herein.

FIG. 8 is a block diagram illustrating components of a machine 800, according to some example embodiments, able to read instructions from a machine-readable medium (e.g., a machine-readable storage medium or machine-readable storage device) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the flow diagrams of FIGS. 5-7B. Additionally, or alternatively, the instructions 816 may implement one or more of the components of FIGS. 2-3. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a PDA, or any machine capable of executing the instructions 816, sequentially or otherwise, that specify actions to be taken by machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory/storage 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 812 and processor 814 that may execute the instructions 816. The term "processor" is intended to include multi-core processor that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core process), multiple processors with a single core, multiple processors with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of processors 810 are examples of machine-readable media.

As used herein, "machine-readable medium" includes a machine-readable storage device able to store instructions 816 and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862 among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via coupling 882 and coupling 872, respectively. For example, the communication components 864 may include a network interface component or other suitable device to interface with the network 880. In further examples, communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF416, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 880 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or other type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to devices 870. The term "transmission medium" shall be taken to include any intangible medium that is capable of storing, encoding, or carrying instructions 816 for execution by the machine 800, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

We claim:

1. A method for routing a communication session using a second computing device communicatively coupled with a first computing device, the method comprising:
  receiving, from a first computing device, an instruction to establish a communication session using at least one communication protocol that facilitates communication between a packet-switched network and a public switched telephone network;
  determining whether a second computing device is available for communicating with the first computing device based on a determination that the communication session cannot be established, wherein the second computing device is configured to communicate using a cellular radio;

based on the determination that the second computing device is available for communicating with the first computing device, automatically establishing at least one communication channel between the first computing device and the second computing device, wherein audio received at the first computing device is communicated to the second computing device and audio received at the second computing device is communicated to the first computing device; and transmitting an instruction to the second computing device to establish the communication session, wherein audio communicated during the communication session is communicated using the at least one communication channel established between the first computing device and the second computing device.

2. The method of claim 1, wherein the at least one communication protocol comprises a Session Initiation Protocol (SIP).

3. The method of claim 1, wherein determining whether the second computing device is available for communicating with the first computing device comprises communicating with the second computing device using at least one wireless communication protocol.

4. The method of claim 1, wherein the at least one wireless communication protocol comprises Near-Field Communication (NFC).

5. The method of claim 1, further comprising:
based on the determination that the first computing devices is unable to communicate with the second computing device:
attempting to establish at least one communication channel with a third computing device in proximity to the first computing device, wherein audio originating at the first computing device is communicated to the third computing device and audio received at the third computing device is communicated to the first computing device; and
based on successfully establishing the at least one communication channel between the first computing device and the third computing device, transmitting an instruction to the third computing device to establish the communication session using a cellular radio frequency, wherein audio communicated during the communication session is communicated using the at least one communication channel established between the first computing device and the third computing device.

6. The method of claim 1, wherein the received instruction that the communication session cannot be established comprises an instruction to establish the communication session using the second computing device.

7. The method of claim 1, wherein transmitting the instruction to the second computing device to establish the communication session comprises instructing a communication session application executable by the second computing device to establish the communication session.

8. A system for routing a communication session using a second computing device communicatively coupled with a first computing device, the system comprising:
one or more hardware processors; and
a computer storage device having computer-executable instructions stored thereon that, when executed by the one or more hardware processors, configures the system to:

receive, from a first computing device, an instruction to establish a communication session using at least one communication protocol that facilitates communication between a packet-switched network and a public switched telephone network;

determine whether a second computing device is available for communicating with the first computing device based on a determination that the communication session cannot be established, wherein the second computing device is configured to communicate using a cellular radio;

based on the determination that the second computing device is available for communicating with the first computing device, automatically establish at least one communication channel between the first computing device and the second computing device, wherein audio received at the first computing device is communicated to the second computing device and audio received at the second computing device is communicated to the first computing device; and transmit an instruction to the second computing device to establish the communication session, wherein audio communicated during the communication session is communicated using the at least one communication channel established between the first computing device and the second computing device.

9. The system of claim 8, wherein the at least one communication protocol comprises a Session Initiation Protocol (SIP).

10. The system of claim 8, wherein the system is configured to determine whether the second computing device is available for communicating with the first computing device by communicating with the second computing device using at least one wireless communication protocol.

11. The system of claim 8, wherein the at least one wireless communication protocol comprises Near-Field Communication (NFC).

12. The system of claim 8, wherein the system is further configured to:
based on the determination that the second computing device is unable to communicate with the first computing device:
attempt to establish at least one communication channel with a third computing device in proximity to the first computing device, wherein audio originating at the first computing device is communicated to the third computing device and audio received at the third computing device is communicated to the first computing device; and
based on successfully establishing the at least one communication channel between the first computing device and the third computing device, transmit an instruction to the third computing device to establish the communication session using a cellular radio frequency, wherein audio communicated during the communication session is communicated using the at least one communication channel established between the first computing device and the third computing device.

13. The system of claim 8, wherein the received instruction that the communication session cannot be established comprises an instruction to establish the communication session using the second computing device.

14. The system of claim 8, wherein the system is configured to transmit the instruction to the second computing device to establish the communication session by instructing a communication session application executable by the second computing device to establish the communication session.

15. A system for routing a communication session using a second computing device communicatively coupled with a first computing device, the system comprising:
  means for receiving, from a first computing device, an instruction to establish a communication session using at least one communication protocol that facilitates communication between a packet-switched network and a public switched telephone network;
  means for determining whether a second computing device is available for communicating with the first computing device, the second computing device configured to communicate using a cellular radio;
  means for automatically establishing at least one communication channel between the first computing device and the second computing device based on the determination that the second computing device available for communicating with the first computing device, wherein audio received at the first computing device is communicated to the second computing device and audio received at the second computing device is communicated to the first computing device; and
  means for transmitting an instruction to the second computing device to establish the communication session, wherein audio communicated during the communication session is communicated using the at least one communication channel established between the first computing device and the second computing device.

16. The system of claim 15, wherein the at least one communication protocol comprises a Session Initiation Protocol (SIP).

17. The system of claim 15, wherein the means for determining whether the second computing device is available for communicating with the first computing device comprises communicating with the second computing device using at least one wireless communication protocol.

18. The system of claim 15, wherein the at least one wireless communication protocol comprises Near-Field Communication (NFC).

19. The system of claim 15, wherein based on a determination that the second computing device is not available for communicating with the first computing device:
  the means for automatically establishing attempt to establish at least one communication channel with a third computing device in proximity to the first computing device, wherein audio originating at the first computing device is communicated to the third computing device and audio received at the third computing device is communicated to the first computing device; and
  based on successfully establishing the at least one communication channel between the first computing device and the third computing device, the means for transmitting transmit an instruction to the third computing device to establish the communication session using a cellular radio frequency, wherein audio communicated during the communication session is communicated using the at least one communication channel established between the first computing device and the third computing device.

20. The system of claim 15, wherein the received instruction that the communication session cannot be established comprises an instruction to establish the communication session using the second computing device.

* * * * *